United States Patent
Miyazaki

(10) Patent No.: US 9,465,422 B2
(45) Date of Patent: Oct. 11, 2016

(54) INFORMATION PROCESSING SYSTEM AND CONTROL METHOD FOR INFORMATION PROCESSING SYSTEM

(71) Applicant: FUJITSU LIMITED, Kawasaki-shi, Kanagawa (JP)

(72) Inventor: Hiroyuki Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 14/564,864

(22) Filed: Dec. 9, 2014

(65) Prior Publication Data

US 2015/0234439 A1    Aug. 20, 2015

(30) Foreign Application Priority Data

Feb. 20, 2014 (JP) ................. 2014-030682

(51) Int. Cl.
*G06F 1/20* (2006.01)
*G06F 1/26* (2006.01)

(52) U.S. Cl.
CPC ............... *G06F 1/26* (2013.01); *G06F 1/206* (2013.01)

(58) Field of Classification Search
CPC .................... G06F 1/26; G06F 1/206
See application file for complete search history.

(56) References Cited

U.S. PATENT DOCUMENTS

| | | | | |
|---|---|---|---|---|
| 7,106,590 B2* | 9/2006 | Chu | ..................... | H05K 7/2079 165/104.33 |
| 8,411,439 B1* | 4/2013 | Carlson | .............. | H05K 7/20827 165/104.33 |
| 8,760,863 B2* | 6/2014 | Campbell | .......... | H05K 7/20709 361/600 |
| 8,797,740 B2* | 8/2014 | Campbell | .......... | H05K 7/20709 29/592.1 |
| 2003/0214782 A1* | 11/2003 | Osborn | .............. | H05K 7/20727 361/679.47 |
| 2005/0122685 A1* | 6/2005 | Chu | ..................... | H05K 7/2079 361/699 |
| 2009/0204270 A1* | 8/2009 | Garcia | .............. | G05D 23/1934 700/300 |
| 2013/0174145 A1* | 7/2013 | Chen | ..................... | G06F 9/5094 718/1 |
| 2015/0058659 A1* | 2/2015 | Brundridge | .......... | G06F 11/2025 714/4.11 |
| 2016/0007506 A1* | 1/2016 | Karasawa | .......... | H05K 7/20745 361/679.48 |

FOREIGN PATENT DOCUMENTS

| | | |
|---|---|---|
| JP | 2-121014 | 5/1990 |
| JP | 7-219864 | 8/1995 |
| JP | 11-53329 | 2/1999 |

* cited by examiner

*Primary Examiner* — M Elamin
(74) *Attorney, Agent, or Firm* — Staas & Halsey LLP

(57) ABSTRACT

An information processing system that includes a casing and a plurality of other casings, the casing containing a plurality of information processing devices which are respectively connected through communication paths to a plurality of other information processing devices contained in the plurality of other casings, wherein the plurality of information processing devices each includes; a detection unit that detects connection states of all target communication paths to and from a plurality of target information processing devices contained in target casings, among the plurality of other casings, in a range of influence, such as commonly cooled by a same cooling device; a holding unit that holds the connection state information of all the target communication paths detected by the detection unit; and a control unit that controls power supplies for the information processing device, based on the connection state information the holding unit holds.

8 Claims, 18 Drawing Sheets

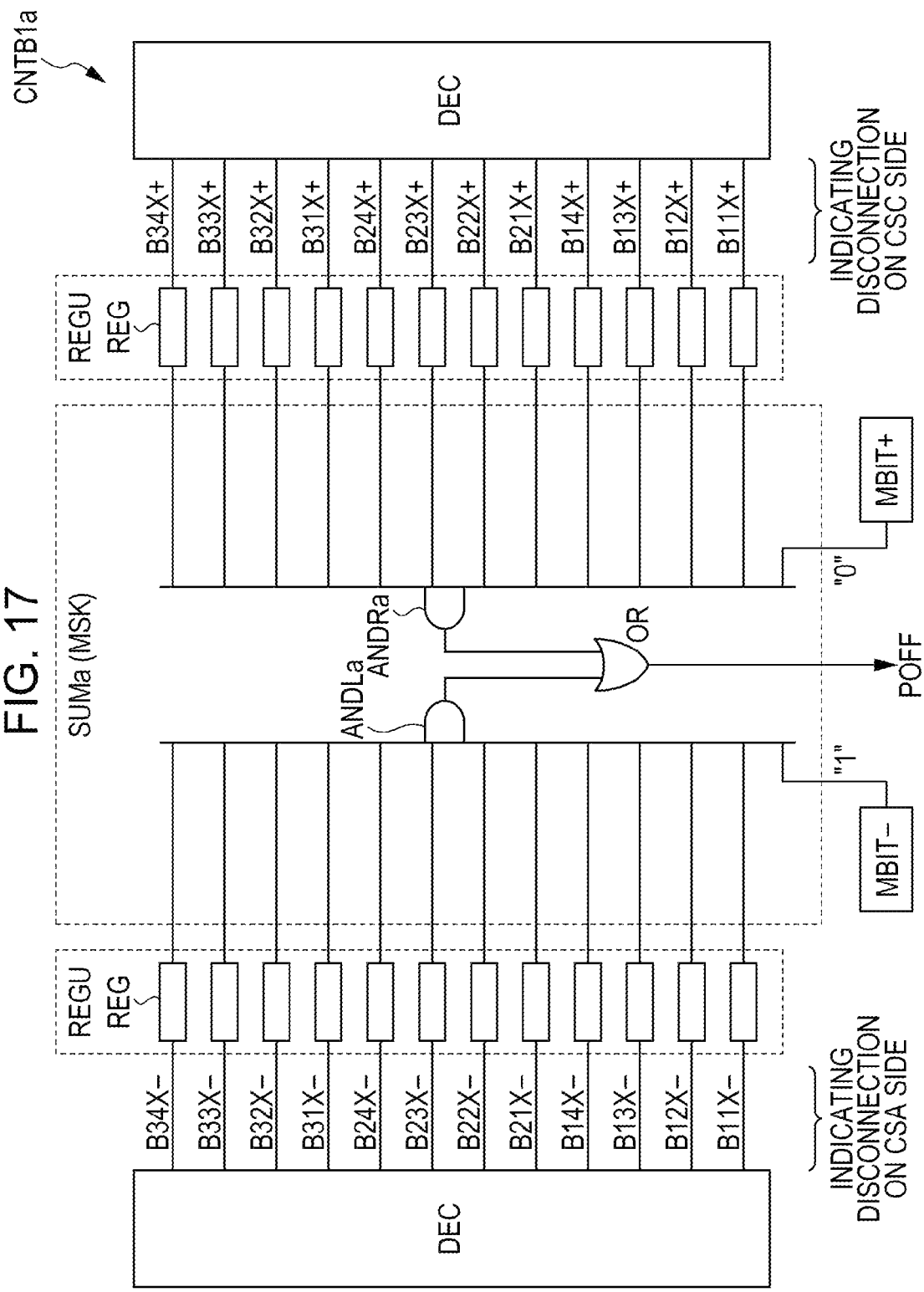

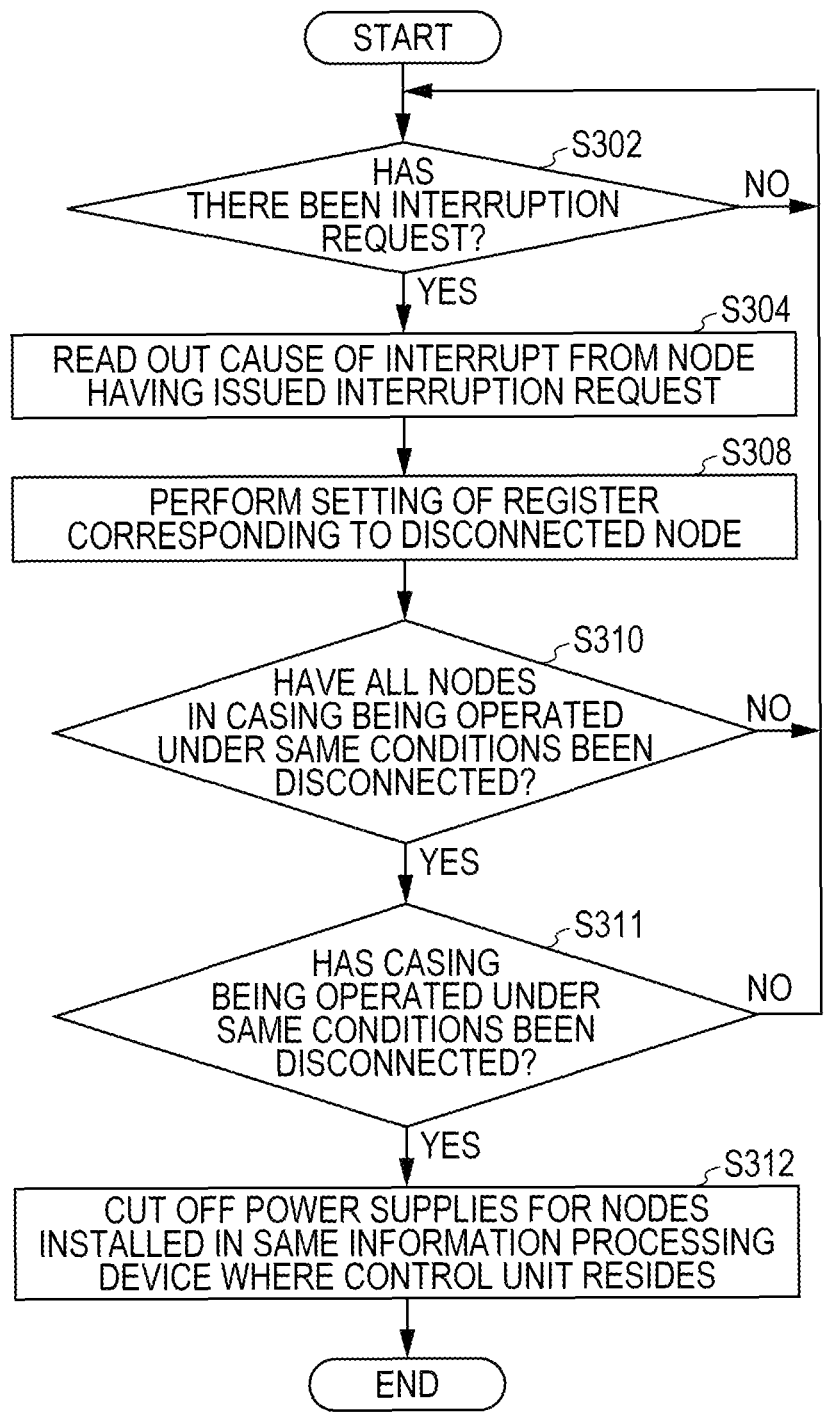

INFORMATION PROCESSING SYSTEM AND CONTROL METHOD FOR INFORMATION PROCESSING SYSTEM

CROSS-REFERENCE TO RELATED APPLICATION

This application is based upon and claims the benefit of priority of the prior Japanese Patent Application No. 2014-030682, filed on Feb. 20, 2014, the entire contents of which are incorporated herein by reference.

FIELD

The embodiments discussed herein are related to an information processing system and a control method for the information processing system.

BACKGROUND

In the past, information processing systems in which capacity for information processing is improved by parallel operation of a plurality of processors have been proposed. The information processing systems of this type are each provided with registers in which error information indicating an error that occurs in the processors is stored. A monitoring unit refers to the registers when the system is rebooted. In a case where the error information is included in contents of the registers, the monitoring unit stops supplying power supply voltage to the processor in which the error has occurred (see Japanese Laid-open Patent Publication No. 11-53329, for instance).

In a parallel computer system in which a plurality of logical packages and power supply units are housed in each of a plurality of casings, each power supply unit is provided for a specified number of logical packages, for instance. In a case where one of the logical packages malfunctions, software that controls operations in the casing identifies logical packages that receive power supply voltage common to the malfunctioning logical package, performs saving processing for the identified logical packages, and thereafter stops operations of the power supply unit. Maintenance for the parallel computer system is performed while logical packages connected to power supply units of which operations are not stopped are operated (see Japanese Laid-open Patent Publication No. 7-219684, for instance).

Furthermore, dew condensation that occurs in a computer device is detected by a dew condensation sensor installed in the computer device, power supply to the computer device is then stopped, and malfunctions due to the dew condensation are thereby reduced (see Japanese Laid-open Patent Publication No. 2-121014, for instance).

In a system in which a plurality of casings containing a plurality of information processing devices share a cooling device that cools the information processing devices, for instance, a casing may be influenced by an abnormality such as dew condensation that occurs in another casing and thus dew condensation may occur in the casing.

It is therefore desirable to cut off power supplies for the information processing devices contained in the casing in a case where a power supply for a specified number of information processing devices contained in another casing in a range under influence of the dew condensation or the like is cut off from such a cause as the dew condensation.

By contrast, casings that share no cooling device undergo no influence of such an abnormality as dew condensation that occurs in another casing and then may continue operating without cutoff of power supplies for information processing devices contained therein.

A technique, however, for a plurality of casings in a range of influence where an abnormal state exerts influence in which each of information processing devices contained in a casing detects a state of each of information processing devices contained in another casing and in which power supplies are accordingly cut off has not been proposed.

An information processing system of the disclosure and a control method for the information processing system of the disclosure are intended for cutoff of power supplies with detection, by a plurality of information processing devices in a casing, of states of a plurality of information processing devices in other casings in a plurality of casings in a range of influence in which an abnormal state exerts influence.

SUMMARY

According to an aspect of the invention, an information processing system includes a casing and a plurality of other casings, the casing containing a plurality of information processing devices which are respectively connected through communication paths to a plurality of other information processing devices contained in the plurality of other casings, wherein the plurality of information processing devices each includes; a detection unit that detects connection states of all target communication paths to and from a plurality of target information processing devices contained in target casings, among the plurality of other casings, in a range of influence, such as commonly cooled by a same cooling device; a holding unit that holds the connection state information of all the target communication paths detected by the detection unit; and a control unit that controls power supplies for the information processing device, based on the connection state information the holding unit holds.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 illustrates examples of a register unit and a summation unit that are illustrated in FIG. 16; and FIG. 18 illustrates an example of operations of the control unit illustrated in FIG. 16.

DESCRIPTION OF EMBODIMENTS

Hereinbelow, embodiments will be described with reference to the accompanying drawings.

Figure 1:
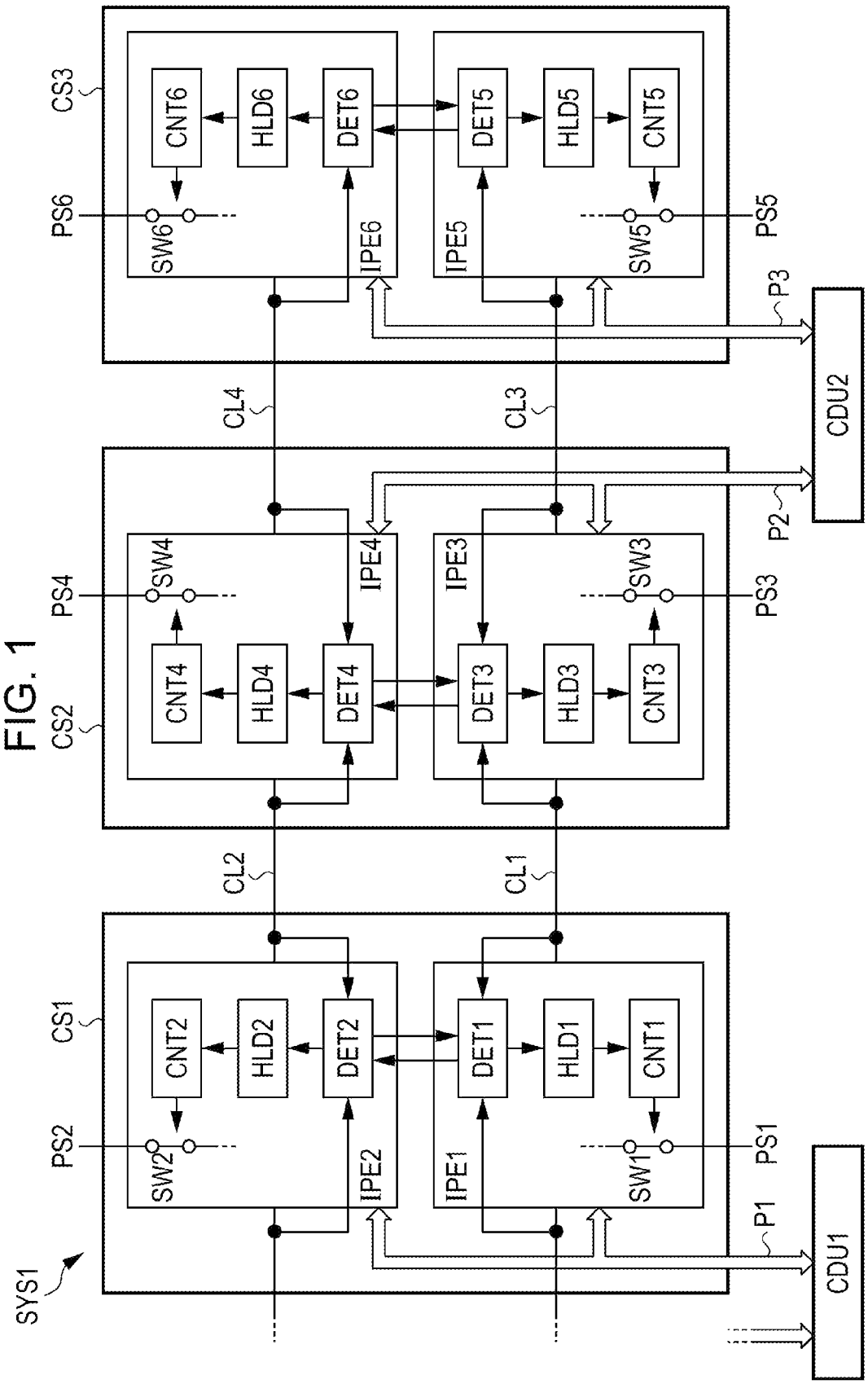
FIG. 1 illustrates an embodiment of an information processing system and a control method for the information processing system.

FIG. 1 illustrates an embodiment of an information processing system and a control method for the information processing system. The information processing system SYS1 illustrated in FIG. 1 includes a plurality of casings CS (CS1, CS2, CS3) that contain information processing devices IPE (IPE1, IPE2, IPE3, IPE4, IPE5, IPE6). The casings CS2 and CS3 are connected through cooling pipes P (P2, P3) to a cooling device CDU2 common between the casings CS2 and CS3, for instance. The casing CS1 is connected through a cooling pipe P (P1) to a cooling device CDU1 different from the cooling device CDU2. The cooling devices CDU1 and CDU2 circulate coolant such as cooling water through the cooling pipes P and thereby cool the information processing devices IPE. The cooling devices CDU1 and CDU2 may be each provided so as to be common among three or more casings CS. Each casing CS may be an equipment frame or a locker.

The information processing device IPE3 is connected to the information processing devices IPE1 and IPE5 via communication paths CL (CL1, CL3) through which information is transmitted. The information processing device IPE4 is connected to the information processing devices IPE2 and IPE6 via communication paths CL (CL2, CL4) through which information is transmitted.

The information processing devices IPE respectively include detection units DET (DET1, DET2, DET3, DET4, DET5, DET6) and holding units HLD (HLD1, HLD2, HLD3, HLD4, HLD5, HLD6). The information processing devices IPE respectively include control units CNT (CNT1, CNT2, CNT3, CNT4, CNT5, CNT6). The information processing devices IPE each include a processor such as central processing unit (CPU) and a controller that has a function of performing communication between the information processing devices IPE contained in the casing CS and the information processing devices IPE contained in other casings CS, for instance.

Each of the detection units DET detects connection states of the communication paths CL connected to the casing CS containing the information processing device IPE including the detection unit DET and thereby detects stoppage of information processing devices IPE contained in other casings that share the cooling device CDU. For instance, the detection unit DET3 detects the connection state of the communication path CL3, notifies the detection unit DET4 of the detected connection state of the communication path CL3, and is notified of the connection state of the communication path CL4 the detection unit DET4 detects. Similarly, the detection unit DET4 detects the connection state of the communication path CL4, notifies the detection unit DET3 of the detected connection state of the communication path CL4, and is notified of the connection state of the communication path CL3 the detection unit DET3 detects.

The information processing devices IPE3 and IPE4 contained in the casing CS2 may undergo a given influence in a case where the information processing devices IPE5 and IPE6 contained in the casing CS3 that shares the cooling device CDU2 out of the casings CS1 and CS3 are stopped. In a case where an abnormality in the cooling device CDU2 causes supercooling of the coolant and thus causes dew condensation on the cooling pipe P3, for instance, power supplies for the information processing devices IPE5 and IPE6 are cut off. In this case, there is a high possibility that the coolant circulating through the cooling pipe P2 is also supercooled and that dew condensation thus occurs on the cooling pipe P2. Therefore, the information processing devices IPE3 and IPE4 contained in the casing CS2 are preferably stopped (cutoff of power supplies PS, for instance) based on detection, by the detection units DET3 and DET4, of cutoff in the connection states (communication states) of the communication paths CL3 and CL4.

In a case where an abnormality in the cooling device CDU1 causes dew condensation on the cooling pipe P1 and thus causes stoppage of the information processing devices IPE1 and IPE2, communication from the information processing devices IPE1 and IPE2 through the communication paths CL1 and CL2 to the information processing devices IPE3 and IPE4 is cut off. The information processing devices IPE3 and IPE4 that do not share the cooling device CDU1, however, receive no influence of the dew condensation on the cooling pipe P1. Therefore, it does not matter if the information processing devices IPE3 and IPE4 continue operating when the detection units DET3 and DET4 detect the cutoff in the connection states (communication states) of the communication paths CL1 and CL2.

In a case where the coolant is leaked due to a breakage in the cooling pipe P3, the information processing devices IPE3 and IPE4 are preferably stopped along with the information processing devices IPE5 and IPE6 because there is fear that the coolant circulating through the cooling pipe P2 may be lost. In a case where the coolant is leaked due to a breakage in the cooling pipe P1, there is no problem even if the information processing devices IPE3 and IPE4 that do not share the cooling device CDU1 continue operating because the information processing devices IPE3 and IPE4 are not influenced by the breakage in the cooling pipe P1. In a case where the cooling device CDU2 is stopped due to a failure, the information processing devices IPE3 and IPE4 are preferably stopped along with the information processing devices IPE5 and IPE6. In a case where the cooling device CDU1 is stopped due to a failure, there is no problem even if the information processing devices IPE3 and IPE4 continue operating because the information processing devices IPE3 and IPE4 are not influenced by the failure in the cooling device CDU1.

Thus the detection units DET3 and DET4 detect the connection states of the target communication paths CL3 and CL4 to and from the target casing CS3 in a range of influence from which the information processing devices IPE3 and IPE4 receive a given influence in a case where the information processing devices IPE5 and IPE6 are stopped. In other words, the detection units DET3 and DET4 detect the connection states of the target communication paths CL3 and CL4 to and from the target casing CS3 that is operated on the same operating condition as those for the casing CS2 in a case where the information processing devices IPE5 and IPE6 in the casing CS3 that is operated on the same operating condition are stopped. In an example illustrated in FIG. 1, the operating condition is a cooling condition that the common cooling device CDU2 is used.

The detection units DET3 and DET4 may mask the detection of the connection states of the communication paths CL1 and CL2 to and from the casing CS1 out of the range of influence from which the information processing devices IPE3 and IPE4 receive the given influence in a case where the information processing device IPE1 and IPE2 are stopped. In a case where the detection units DET3 and DET4 detect the cutoff in the connection states (communication states) of the target communication paths CL1 and CL2, the information processing devices IPE3 and IPE4 do not stop but continue operating. A function of detecting the connection states of the communication paths CL1 and CL2 may be omitted from the detection units DET3 and DET4.

The holding units HLD3 and HLD4 hold connection state information (indicating either connection state or cutoff state) indicating the connection states of the target communication paths CL3 and CL4 that are subjected to the detection by the detection units DET3 and DET4. The detection unit DET3 receives via the detection unit DET4 the connection state information for the target communication path CL4 that is subjected to the detection by the detection unit DET4 and the detection unit DET4 receives via the detection unit DET3 the connection state information for the target communication path CL3 that is subjected to the detection by the detection unit DET3, for instance.

The holding units HLD3 and HLD4 may hold connection state information indicating the connection states of the communication paths CL1 and CL2 that are subjected to the detection by the detection units DET3 and DET4. The connection state information indicating the connection states of the communication paths CL1 and CL2, however, is not used because the communication paths CL1 and CL2 connected to the casing CS1 out of the range of the given influence are not the target communication paths.

The control units CNT3 and CNT4 control the power supplies PS3 and PS4 for the information processing devices IPE3 and IPE4, based on the connection state information the holding units HLD3 and HLD4 hold, respectively. For instance, the control units CNT3 and CNT4 cut off the power supplies PS3 and PS4 for the information processing devices IPE3 and IPE4 when the connection state information held by the holding units HLD3 and HLD4 indicates disconnection states of the target communication path CL3 and CL4. The control units CNT3 and CNT4 cut off the power supplies PS3 and PS4 by setting, into cutoff state, switches SW3 and SW4 provided on paths through which the power supplies PS3 and PS4 are supplied to the information processing devices IPE3 and IPE4, though there is no particular limitation thereto.

The detection units DET1 and DET2 and the detection units DET5 and DET6 may have the same function as the detection units DET3 and DET4 have, and the holding units HLD1 and HLD2 and the holding units HLD5 and HLD6 may have the same function as the holding units HLD3 and HLD4 have, for instance. The control units CNT1 and CNT2 and the control units CNT5 and CNT6 may have the same function as the control units CNT3 and CNT4 have.

Figure 2:
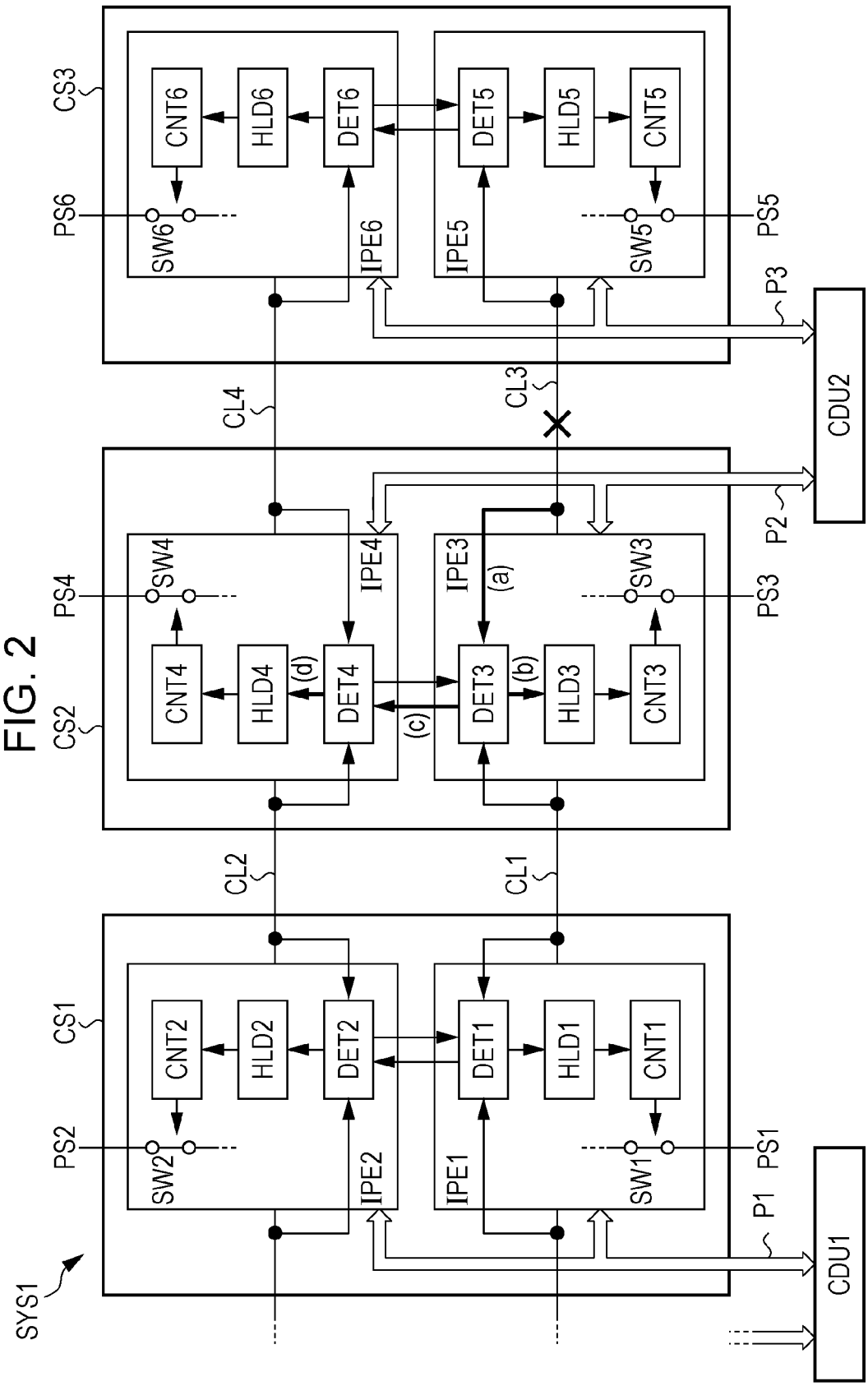
FIG. 2 illustrates an example of operations of the information processing system illustrated in FIG. 1.

FIG. 2 illustrates an example of operations of the information processing system SYS1 illustrated in FIG. 1. In this example, the power supply PS5 for the information processing device IPE5 that is among the information processing devices in the casing CS3 is cut off in response to an abnormality in the casing CS3. The cutoff of the power supply PS5 causes cutoff of communication through the communication path CL3 (sign "X" in FIG. 2). Thick arrows in the drawing represent flow of the operations.

The detection unit DET3 detects that the communication path CL3 connected to the information processing device IPE5 is in the disconnection state and writes the connection state information into the holding unit HLD3 ((a) and (b) in FIG. 2). The detection unit DET3 also notifies other detection units (DET4 in the example) in the casing CS2 of information indicating that the communication path CL3 is in the disconnection state ((c) in FIG. 2). The detection unit DET4 writes into the holding unit HLD4 the connection state information received from the detection unit DET3 ((d) in FIG. 2).

Then the control unit CNT3 does not perform control configured to cut off the power supply PS3 because the connection state information held by the holding unit HLD3 does not indicate that both the communication paths CL3 and CL4 connected to the casing CS3 that shares the cooling device CDU2 are in the disconnection state. Similarly, the control unit CNT4 does not perform control configured to cut off the power supply PS4 because the connection state information held by the holding unit HLD4 does not indicate that both the communication paths CL3 and CL4 connected to the casing CS3 that shares the cooling device CDU2 are in the disconnection state. That is, when it is indicated that either of the target communication paths CL3 and CL4 to and from the target casing CS3 in the range of the given influence is in the connection state, the information processing devices IPE3 and IPE4 continue operating without cutting off the power supplies PS3 and PS4.

Figure 3:
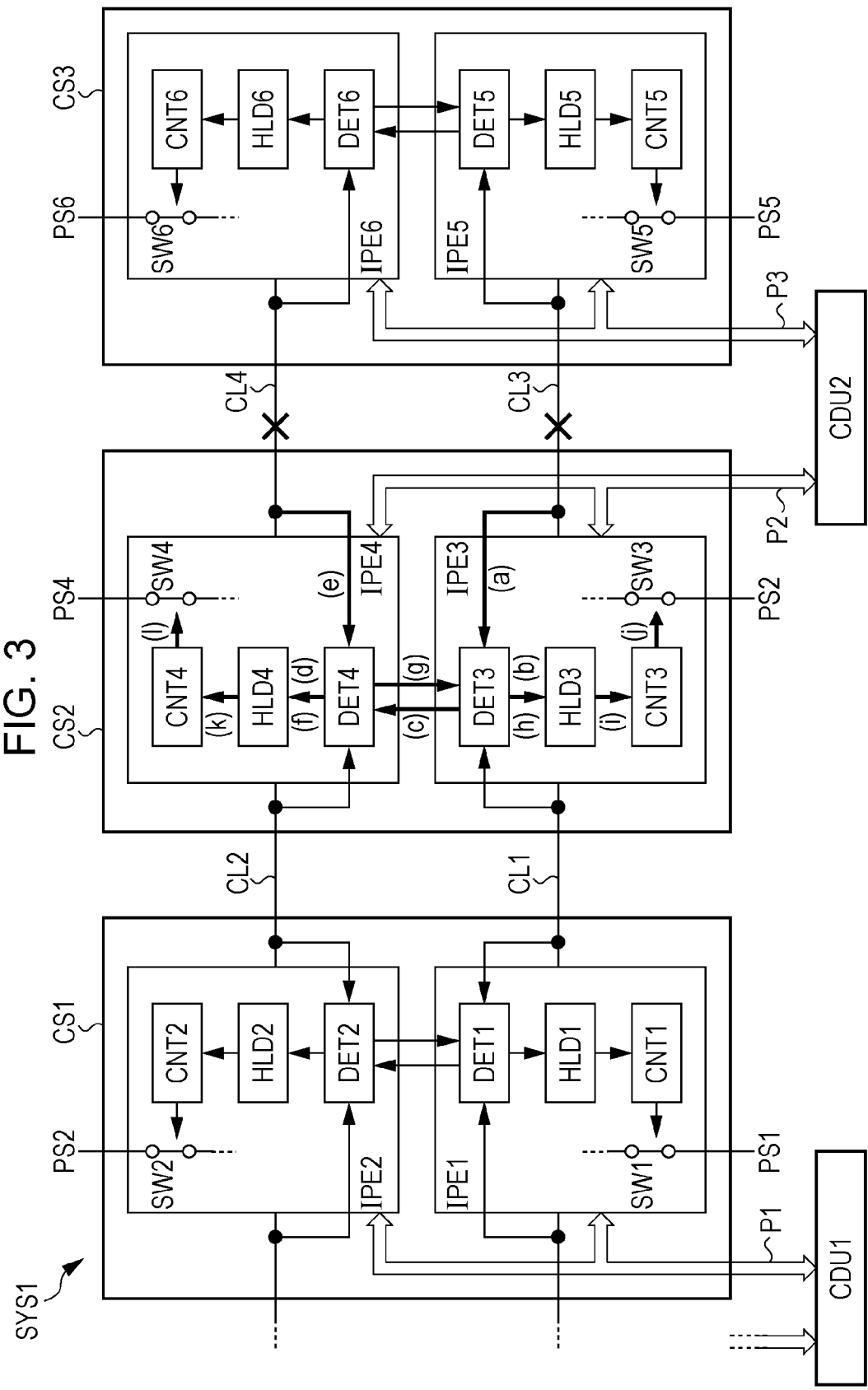
FIG. 3 illustrates another example of operations of the information processing system illustrated in FIG. 1.

FIG. 3 illustrates another example of operations of the information processing system SYS1 illustrated in FIG. 1. Operations identical or similar to those in FIG. 2 are designated by the same reference characters as in FIG. 2 and detailed description therefor is omitted. Reference characters (a) to (d) illustrated in FIG. 3 represent the same operations as are designated by reference characters (a) to (d) in FIG. 2. In this example, the power supplies PS5 and PS6 for the information processing devices IPE5 and IPE6 in the casing CS3 are cut off based on the dew condensation on the cooling pipe P3 due to the supercooling of the coolant, leakage of the coolant from the cooling pipe P3, failure in the cooling device CDU2, or the like. The cutoff of the power supplies PS5 and PS6 causes cutoff of communication through the communication paths CL3 and CL4 (signs "X" in FIG. 3).

The detection unit DET4 detects that the communication path CL4 connected to the information processing device IPE6 is in the disconnection state and writes the connection state information into the holding unit HLD4 ((e) and (f) in FIG. 3). The detection unit DET4 also notifies other detection units (DET3 in the example) in the casing CS2 of information indicating that the communication path CL4 is in the disconnection state ((g) in FIG. 3).

The detection unit DET3 performs the operations illustrated in FIG. 2 and additionally writes into the holding unit HLD3 the connection state information received from the detection unit DET4 ((h) in FIG. 3). Then the control unit CNT3 cuts off the power supply PS3 because the connection state information held by the holding unit HLD3 indicates that both the communication paths CL3 and CL4 connected to the casing CS3 that shares the cooling device CDU2 are in the disconnection state ((i) and (j) in FIG. 3).

Similarly, the control unit CNT4 then cuts off the power supply PS4 because the connection state information held by the holding unit HLD4 indicates that the communication paths CL3 and CL4 connected to the casing CS3 that shares the cooling device CDU2 are in the disconnection state ((k) and (l) in FIG. 3). That is, when it is indicated that the target communication paths CL3 and CL4 to and from the target casing CS3 in the range of the given influence are in the disconnection state, the information processing devices IPE3 and IPE4 cut off the power supplies PS3 and PS4.

As the examples illustrated in FIGS. 1 through 3, the examples in which the information processing devices IPE3 and IPE4 cut off the power supplies PS3 and PS4 when it is indicated that all the target communication paths CL3 and CL4 to and from the target casing CS3 in the range of the given influence are in the disconnection state have been described. On condition that the target casing CS3 includes a large number of, namely, three or more (100, for instance) information processing devices IPE, for instance, however, the disconnection states of a specified number of target communication paths CL to and from the target casing CS3 in the range of the given influence may be detected. The power supplies PS for the plurality of information processing devices IPE installed in the casing CS2 may be cut off on condition that the disconnection states of the specified number (80, for instance) of target communication paths CL are detected, for instance.

In the above embodiment illustrated in FIGS. 1 through 3, the information processing devices IPE3 and IPE4 in the casing CS2 may cut off the power supplies PS3 and PS4 based on the disconnection of the communication paths CL3 and CL4 connected to the information processing devices IPE5 and IPE6 in the casing CS3. For instance, when it is indicated that the target communication paths CL3 and CL4 to and from the target casing CS3 are in the disconnection state due to an abnormality in a cooling system shared between the casings CS2 and CS3, the information processing devices IPE3 and IPE4 that are to be influenced by the abnormality may cut off the power supplies PS3 and PS4. That is, the information processing devices IPE3 and IPE4 in the casing CS2 may detect the cutoff of the power supplies PS5 and PS6 for the information processing devices IPE5 and IPE6 in another casing CS3 included in a range where an abnormal state exerts influence and then may cut off the power supplies PS3 and PS4.

The information processing devices IPE3 and IPE4 notify each other of the disconnection states of the communication paths CL3 and CL4 and are thus capable of detecting the cutoff of the power supplies PS5 and PS6 for the information processing devices IPE5 and IPE6 in the casing CS3 included in the range where an abnormal state exerts influence. The connection state information indicating the disconnection states of the communication paths CL3 and CL4 is held by the holding units HLD3 and HLD4. Therefore, the information processing devices IPE3 and IPE4 are capable of cutting off the power supplies PS3 and PS4 even if the disconnections of the communication paths CL3 and CL4 occur with a time lag.

The power supplies PS3 and PS4 for the information processing devices IPE3 and IPE4 may be cut off based on an abnormality that occurs in another casing CS3 without aid of a management device that manages the casings CS or the like. That is, the power supplies PS3 and PS4 for the information processing devices IPE3 and IPE4 may promptly be cut off without additional provision of communication lines for management between the management device and the information processing devices, in comparison with a configuration with aid of the management device or the like.

In a case where either of the communication paths CL3 and CL4 is disconnected, the information processing devices IPE3 and IPE4 do not cut off the power supplies PS3 and PS4. That is, the information processing devices IPE3 and IPE4 do not cut off the power supplies PS3 and PS4 when either of the information processing devices IPE5 and IPE6 in the casing CS3 included in the range of influence where an abnormal state exerts influence is in operation. As a result, the information processing devices IPE3 and IPE4 are capable of discriminating a defect caused by influence of an abnormal state and a defect under no influence of the abnormal state and thereby determining whether the power supplies PS3 and PS4 are to be cut off.

Figure 4:
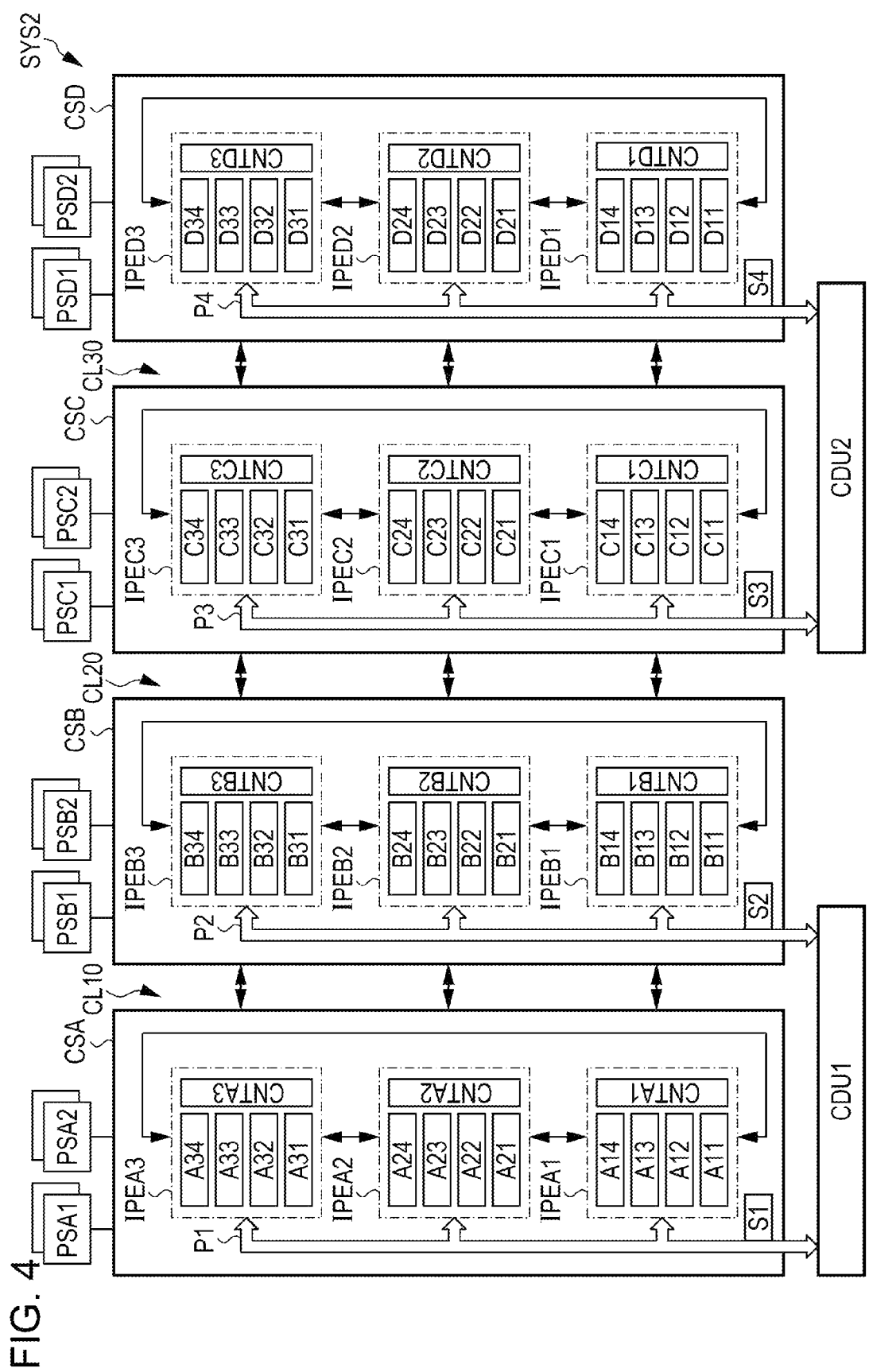
FIG. 4 illustrates another embodiment of an information processing system and a control method for the information processing system.

FIG. 4 illustrates another embodiment of an information processing system and a control method for the information processing system. The information processing system SYS2 of the embodiment includes a plurality of casings CS (CSA, CSB, CSC, CSD) and a plurality of power supply units PS (PSA1, PSA2, PSB1, PSB2, PSC1, PSC2, PSD1, PSD2). The information processing system SYS2 also includes a cooling device CDU1 configured to cool inside of the casings CSA and CSB and a cooling device CDU2 configured to cool inside of the casings CSC and CSD. The cooling devices CDU1 and CDU2 are coolant circulation devices, for instance. Though the cooling devices CDU1 and CDU2 are each provided so as to be common to two casings CS, the cooling devices CDU1 and CDU2 may be provided so as to be common among three or more casings CS.

The casing CSA includes a plurality of information processing devices IPEA (IPEA1, IPEA2, IPEA3), a cooling pipe P1 through which coolant such as cooling water supplied from the cooling device CDU1 is circulated among the information processing devices IPEA, and a dew condensation sensor S1 which is in contact with the cooling pipe P1. The casing CSB includes a plurality of information processing devices IPEB (IPEB1, IPEB2, IPEB3), a cooling pipe P2 through which the coolant supplied from the cooling device CDU1 is circulated among the information processing devices IPEB, and a dew condensation sensor S2 which is in contact with the cooling pipe P2. The casing CSC includes a plurality of information processing devices IPEC (IPEC1, IPEC2, IPEC3), a cooling pipe P3 through which coolant supplied from the cooling device CDU2 is circulated among the information processing devices IPEC, and a dew condensation sensor S3 which is in contact with the cooling pipe P3. The casing CSD includes a plurality of information processing devices IPED (IPED1, IPED2, IPED3), a cooling pipe P4 through which the coolant supplied from the cooling device CDU2 is circulated among the information processing devices IPED, and a dew condensation sensor S4 which is in contact with the cooling pipe P4. The casings CSA, CSB, CSC, and CSD may be equipment frames or lockers, for instance.

In the casing CSA, the information processing device IPEA1 includes a plurality of nodes A1 (A11, A12, A13, A14) and a control unit CNTA1 that controls operations of the nodes A1. The information processing device IPEA2 includes a plurality of nodes A2 (A21, A22, A23, A24) and a control unit CNTA2 that controls operations of the nodes A2. The information processing device IPEA3 includes a plurality of nodes A3 (A31, A32, A33, A34) and a control unit CNTA3 that controls operations of the nodes A3.

In the casing CSB, the information processing device IPEB1 includes a plurality of nodes B1 (B11, B12, B13, B14) and a control unit CNTB1 that controls operations of the nodes B1. The information processing device IPEB2 includes a plurality of nodes B2 (B21, B22, B23, B24) and a control unit CNTB2 that controls operations of the nodes B2. The information processing device IPEB3 includes a plurality of nodes B3 (B31, B32, B33, B34) and a control unit CNTB3 that controls operations of the nodes B3.

In the casing CSC, the information processing device IPEC1 includes a plurality of nodes C1 (C11, C12, C13, C14) and a control unit CNTC1 that controls operations of the nodes Cl. The information processing device IPEC2 includes a plurality of nodes C2 (C21, C22, C23, C24) and a control unit CNTC2 that controls operations of the nodes C2. The information processing device IPEC3 includes a plurality of nodes C3 (C31, C32, C33, C34) and a control unit CNTC3 that controls operations of the nodes C3.

In the casing CSD, the information processing device IPED1 includes a plurality of nodes D1 (D11, D12, D13, D14) and a control unit CNTD1 that controls operations of the nodes D1. The information processing device IPED2 includes a plurality of nodes D2 (D21, D22, D23, D24) and a control unit CNTD2 that controls operations of the nodes D2. The information processing device IPED3 includes a plurality of nodes D3 (D31, D32, D33, D34) and a control unit CNTD3 that controls operations of the nodes D3.

The nodes A1, A2, and A3 of the information processing devices IPEA in the casing CSA and the nodes B1, B2, and B3 of the information processing devices IPEB in the casing CSB are connected to each other, respectively, through communication paths CL10. The nodes B1, B2, and B3 of the information processing devices IPEB in the casing CSB and the nodes C1, C2, and C3 of the information processing devices IPEC in the casing CSC are connected to each other, respectively, through communication paths CL20. The nodes C1, C2, and C3 of the information processing devices IPEC in the casing CSC and the nodes D1, D2, and D3 of the information processing devices IPED in the casing CSD are connected to each other, respectively, through communication paths CL30.

Figure 5:
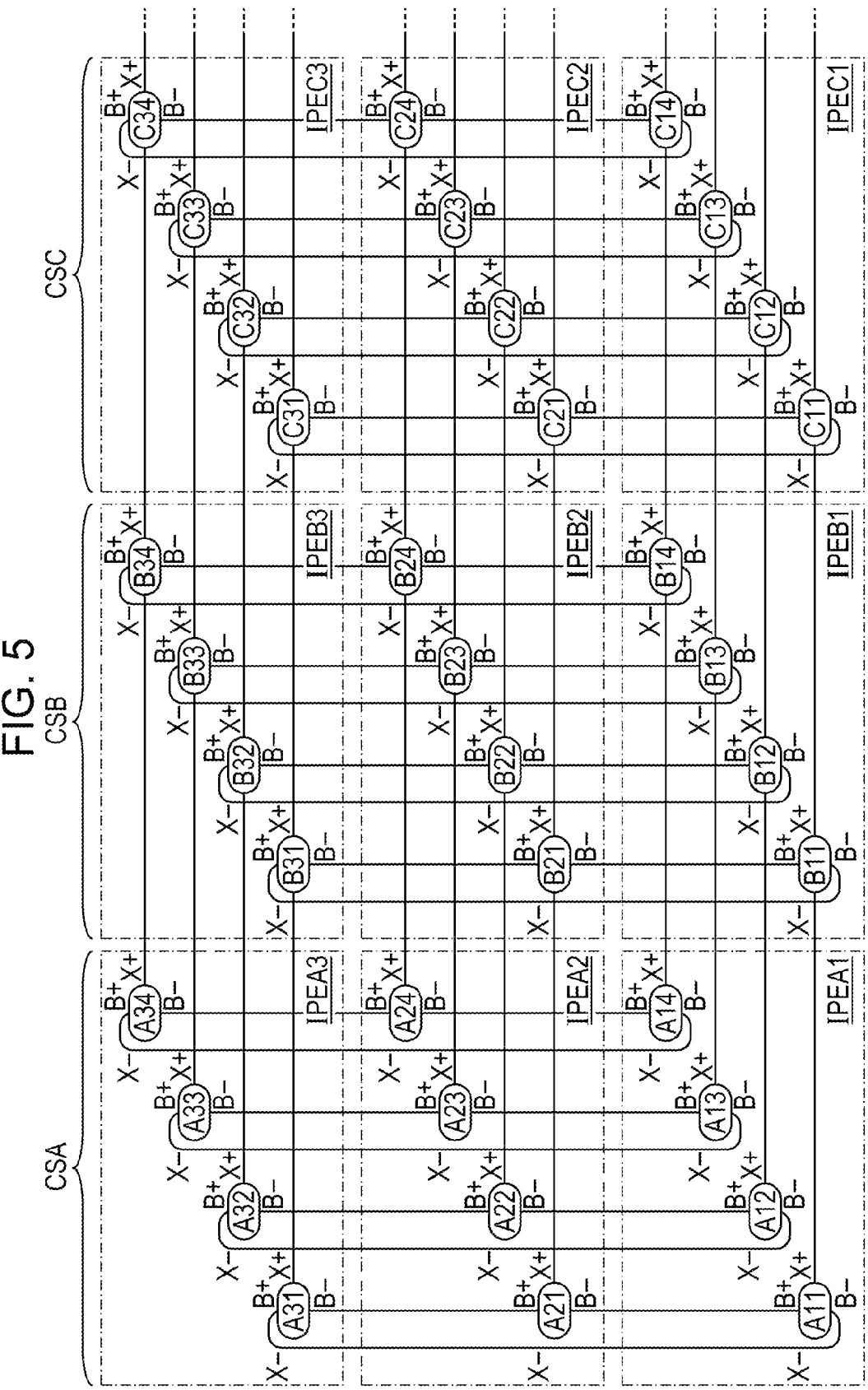
FIG. 5 illustrates an example of connection specifications among nodes illustrated in FIG. 4.
Figure 6:
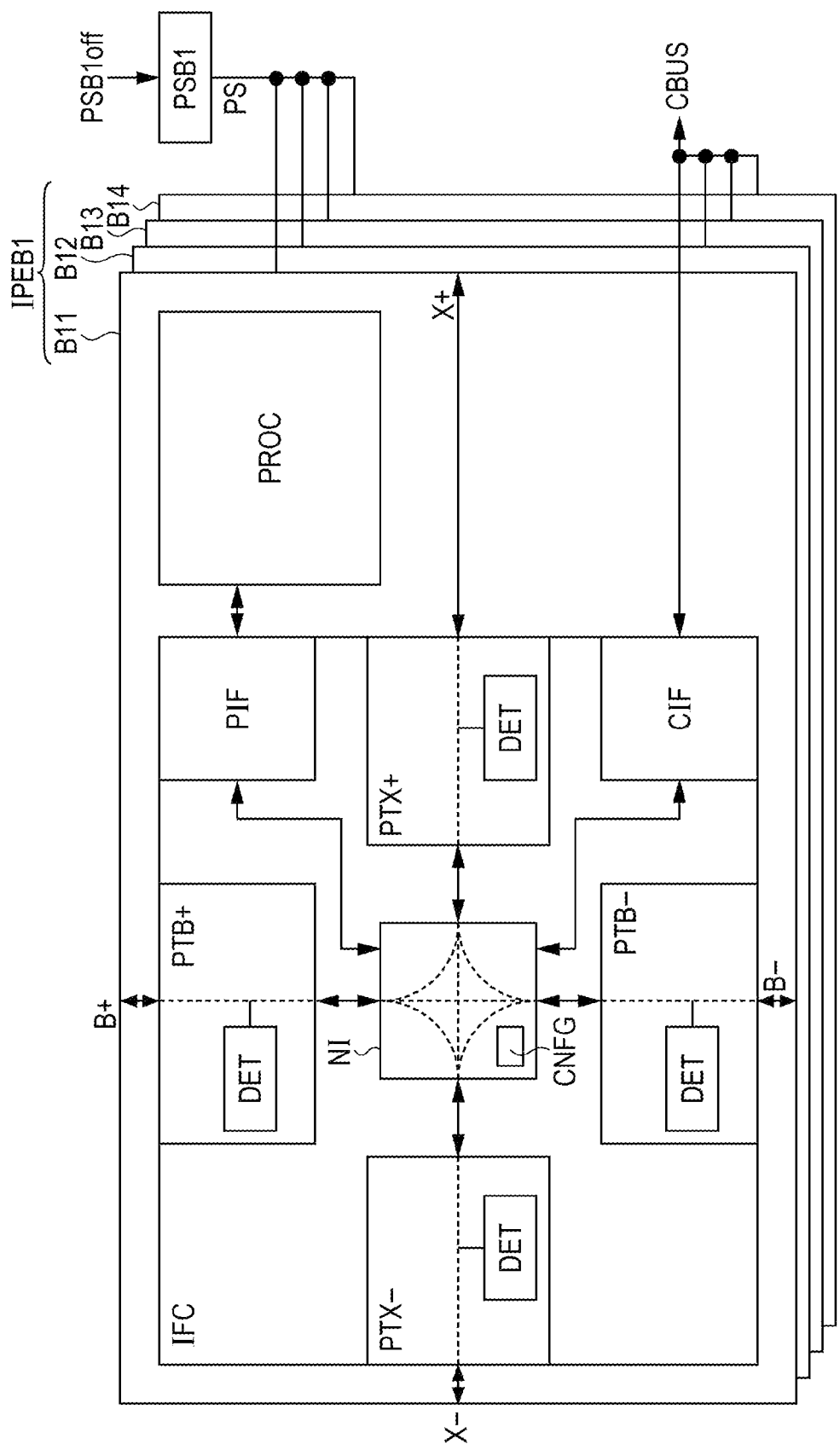
FIG. 6 illustrates an example of the nodes illustrated in FIG. 4.

The nodes A11 through A34, B11 through B34, C11 through C34, and D11 through D34 have the same configuration or similar configurations. A typical example of the node B11 is illustrated in FIG. 6. As illustrated in FIG. 6, the nodes A11 through A34, B11 through B34, C11 through C34, and D11 through D34 each include an interface chip IFC and a processor PROC such as a CPU. Connection specifications among the nodes A11 through A34, B11 through B34, C11 through C34, and D11 through D34 are illustrated in FIG. 5.

Figure 8:
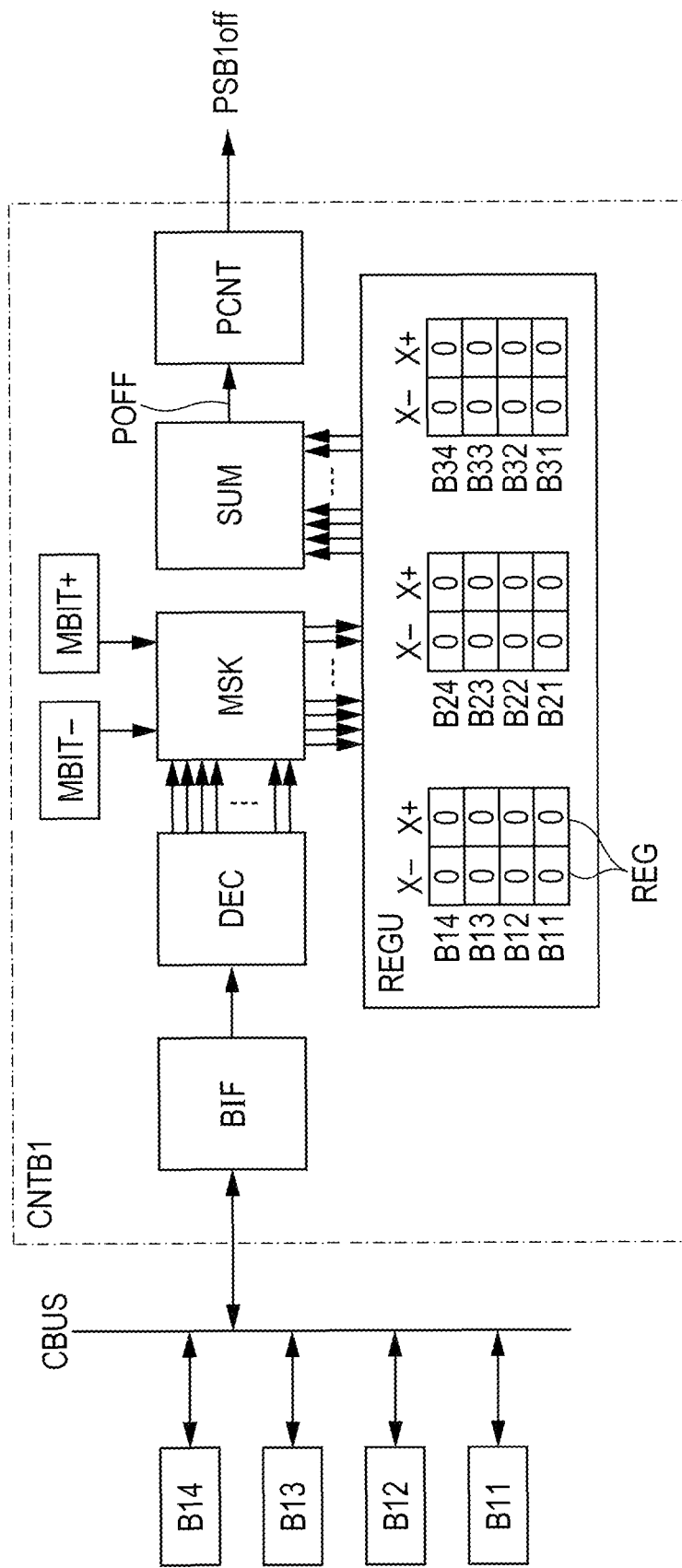
FIG. 8 illustrates an example of a control unit illustrated in FIG. 4.

The control units CNTA (CNTA1 through CNTA3), CNTB (CNTB1 through CNTB3), CNTC (CNTC1 through CNTC3), and CNTD (CNTD1 through CNTD3) have the same configuration or similar configurations. A typical example of the control unit CNTB1 is illustrated in FIG. 8. As illustrated in FIG. 8, the control units CNTA, CNTB, CNTC, and CNTD each include a bus interface BIF, a decoder unit DEC, a mask unit MSK, a register unit REGU, a summation unit SUM, a power supply control unit PCNT, and mask information holding units MBIT− and MBIT+.

Configurations and specifications of the casings CSB, CSC, and CSD are the same as or similar to configuration of the casing CSA and thus the configuration of the casing CSA will be described below.

The cooling pipe P1 is connected to heat dissipation members such as heat sinks that are provided on the nodes A11 through A14 of the information processing device IPEA1, the nodes A21 through A24 of the information processing device IPEA2, and the nodes A31 through A34 of the information processing device IPEA3. The dew condensation sensor S1 includes an element that is made conductive by dew condensation which occurs on the cooling pipe P1 with decrease in temperature of the coolant flowing through the cooling pipe P1, for instance. The dew condensation sensor S1 notifies the control units CNTA1, CNTA2, and CNTA3 of detection of the dew condensation. The dew condensation sensor S1 is preferably placed at a site where dew condensation is prone to occur, without limitation to a site illustrated in FIG. 4. The dew condensation sensor S1 may be placed on the casing or a plurality of dew condensation sensors S1 may be provided at a plurality of sites on the cooling pipe P1.

In place of the dew condensation sensor S1, the casing CSA may include a sensor that is configured to detect leakage of the coolant flowing through the cooling pipe P1 and to notify the control units CNTA. The leakage may be detected on condition that pressure of the coolant flowing through the cooling pipe P1 becomes lower than a given value or may be detected by a dew condensation sensor, for instance. In place of the dew condensation sensor S1, the casing CSA may include a sensor that is configured to detect decrease in the temperature of the coolant flowing through the cooling pipe P1 to below a given value and to notify the control units CNTA. Similarly, the casings CSB, CSC, and CSD may include sensors configured to detect leakage or sensors configured to detect the temperature of the coolant, in place of the dew condensation sensors S2, S3, and S4. That is, the casings CSA, CSB, CSC, and CSD may include the sensors configured to detect an abnormality in cooling by the cooling devices CDU, as the casings include the dew condensation sensors.

Amounts of heat generated from the control units CNTA1, CNTA2, and CNTA3 are smaller than amounts of heat generated from the nodes A11 through A14, A21 through A24, and A31 through A34, for instance, so that reliability of the control units CNTA1, CNTA2, and CNTA3 may be maintained by natural heat radiation. Therefore, the cooling pipe P1 is not connected to the control units CNTA1, CNTA2, and CNTA3, for instance, so that the control units CNTA1, CNTA2, and CNTA3 are not influenced by the dew condensation.

The power supply unit PSA1 is provided corresponding to the information processing devices IPEA1 through IPEA3 and supplies power to the nodes A11 through A14 of the information processing device IPEA1, the nodes A21 through A24 of the information processing device IPEA2, and the nodes A31 through A34 of the information processing device IPEA3. The power supply unit PSA2 is provided corresponding to the information processing devices IPEA1 through IPEA3 and supplies power to the control unit CNTA1 of the information processing device IPEA1, the control unit CNTA2 of the information processing device IPEA2, and the control unit CNTA3 of the information processing device IPEA3.

The power supply unit PSB1 is provided corresponding to the information processing devices IPEB1 through IPEB3 and supplies power to the nodes B11 through B14 of the information processing device IPEB1, the nodes B21 through B24 of the information processing device IPEB2, and the nodes B31 through B34 of the information processing device IPEB3. The power supply unit PSB2 is provided corresponding to the information processing devices IPEB1 through IPEB3 and supplies power to the control unit CNTB1 of the information processing device IPEB1, the control unit CNTB2 of the information processing device IPEB2, and the control unit CNTB3 of the information processing device IPEB3.

Configurations and supply specifications of the power supply units PSC1 and PSD1 are similar to those of the power supply unit PSA1 and configurations and supply specifications of the power supply units PSC2 and PSD2 are similar to those of the power supply unit PSA2. That is, the power supply units PSC1 and PSC2 are provided corresponding to the information processing devices IPEC1, IPEC2, and IPEC3 and the power supply units PSD1 and PSD2 are provided corresponding to the information processing devices IPED1, IPED2, and IPED3.

FIG. 5 illustrates an example of the connection specifications among the nodes illustrated in FIG. 4. X-axes (direction X− and direction X+) represent the communication paths (CL1 through CL3 in FIG. 4) that provide connections between the information processing devices IPE of different casings CS.

For instance, the node A11 has X-axis in direction X+ connected to X-axis (direction X−) of the node B11, has B-axis in direction B+ connected to B-axis (direction B−) of the node A21, and has B-axis in direction B− connected to B-axis (direction B+) of the node A31. Similarly, the node A22 has X-axis in direction X+ connected to X-axis (direction X−) of the node B22, has B-axis in direction B+ connected to B-axis (direction B−) of the node A32, and has B-axis in direction B− connected to B-axis (direction B+) of the node A12.

The node B12 has X-axis in direction X+connected to X-axis (direction X−) of the node C12 and has X-axis in direction X− connected to X-axis (direction X+) of the node A12, for instance. The node B12 has B-axis in direction B+ connected to B-axis (direction B−) of the node B22 and has B-axis in direction B− connected to B-axis (direction B+) of the node B32. Similarly, the node B23 has X-axis in direction X+ connected to X-axis (direction X−) of the node C23 and has X-axis in direction X− connected to X-axis (direction X+) of the node A23. The node B23 has B-axis in direction B+ connected to B-axis (direction B−) of the node B33 and has B-axis in direction B− connected to B-axis (direction B+) of the node B13.

The four nodes in each of the information processing devices IPEA1 through IPEA3, IPEB1 through IPEB3, IPEC1 through IPEC3, and IPED1 through IPED3 (IPED1 through IPED3 are not illustrated) are subjected to torus connection with use of an axis different from X-axis and B-axis, for instance. Thus the information processing system SYS2 illustrated in FIG. 4 has a mesh/torus structure in which three nodes in each casing are connected along B-axis, in which four nodes across the casings are connected along X-axis, and in which four nodes in each information processing device IPE are connected along the axis different from X-axis and B-axis.

FIG. 6 illustrates an example of the node B11 illustrated in FIG. 4. The nodes A11 through A34, the nodes B12 through B34, the nodes C11 through C34, and the nodes D11 through D34 illustrated in FIG. 4 have the same configuration as the node B11 or configurations similar to the node B11.

The node B11 includes the interface chip IFC and the processor PROC such as a CPU. The interface chip IFC has a function of communicating with other nodes B21, B31, C11, and A11 that are connected to the node B11 through B-axis (direction B+ and direction B−) and X-axis (direction X+ and direction X−). The interface chip IFC includes ports PTB+, PTB−, PTX+, PTX−, a network interface NI, a processor interface PIF, and a control interface CIF.

The port PTB+ has a function of transmitting signals to the node B21 connected to B-axis (direction B+) and receiving signals from the node B21. The port PTB− has a function of transmitting signals to the node B31 connected to B-axis (direction B−) and receiving signals from the node B31. The port PTX+ has a function of transmitting signals to the node C11 connected to X-axis (direction X+) and receiving signals from the node C11. The port PTX− has a function of transmitting signals to the node A11 connected to X-axis (direction X−) and receiving signals from the node A11. The ports PTB+, PTB−, PTX+, and PTX− each include a detection unit DET that is configured to detect whether voltage level of a received signal and information such as packets designated by the received signal are normal or abnormal and to notify the network interface NI of results of the detection. That is, each detection unit DET has a function of detecting cutoff of communication with the node connected to the port PTB+, PTB−, PTX+, PTX− through a communication path.

The network interface NI has a function of decoding header information of packets included in signals the ports PTB+, PTB−, PTX+, and PTX− receive, for instance. The network interface NI outputs the received packets to the port PTB+, PTB−, PTX+, PTX−, or the processor interface PIF, in accordance with a destination included in the decoded header information. In a case where the detection units DET detect an abnormality, the network interface NI also outputs information indicating the abnormality to the control unit CNTB1 illustrated in FIG. 4 via the control interface CIF and a control bus CBUS. In a case where the detection units DET detect the abnormality, the network interface NI further directs that the port designated by a destination registered in a configuration table CNFG outputs the information indicating the abnormality. An example of the configuration table CNFG is illustrated in FIG. 7.

The processor interface PIF controls communication between the network interface NI and the processor PROC such as CPU. The control interface CIF controls communication between the network interface NI and the control unit CNTB1.

Figure 7:
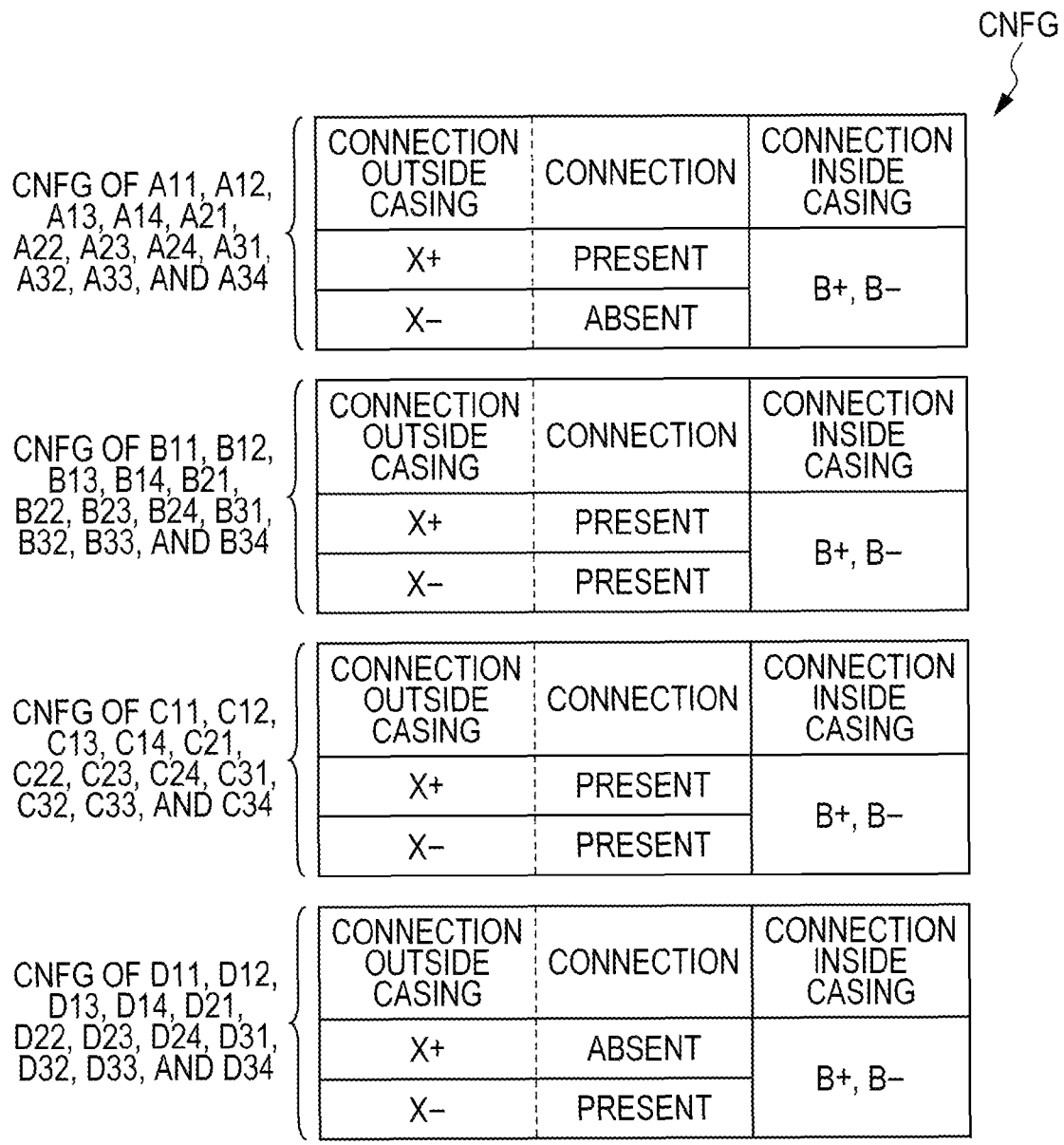
FIG. 7 illustrates examples of a configuration table illustrated in FIG. 6.

FIG. 7 illustrates the examples of the configuration table CNFG illustrated in FIG. 6. The configuration table CNFG is provided in each of the nodes A11 through A34, the nodes B11 through B34, the nodes C11 through C34, and the nodes D11 through D34. The configuration table CNFG includes information (connection outside casing) indicating whether the nodes in other casings CS are connected through X-axis (direction X+ and direction X−) and information (connection inside casing) indicating that the nodes in the casing CS are connected through B-axis (direction B+ and direction B−).

For instance, the nodes A11 through A34 installed in the casing CSA are connected to the nodes B11 through B34 in the direction X+ but are connected to no nodes in the direction X−, as illustrated in FIG. 5. Therefore, information indicating "PRESENT" is stored in an area indicating connection in the direction X+ and information indicating "ABSENT" is stored in an area indicating connection in the direction X−. Upon reception of information indicating an abnormality from the port PTX+corresponding to the direction X+, the network interface NI illustrated in FIG. 6 notifies the control interface CIF of the received information, based on "PRESENT" in the configuration table CNFG, for instance. Upon reception of information indicating an abnormality from the port PTX+ corresponding to the direction X+, the network interface NI notifies the ports PTB+ and PTB− of the received information, based on "B+, B−" in "CONNECTION INSIDE CASING" in the configuration table CNFG. Upon reception of information indicating an abnormality from the port PTX− corresponding to the direction X−, the network interface NI ignores the received information, based on "ABSENT" in the configuration table CNFG, for instance.

Similarly, the nodes B11 through B34 installed in the casing CSB are connected to the nodes C11 through C34 in the direction X+ and are connected to the nodes A11 through A34 in the direction X−. Accordingly, the information indicating "PRESENT" is stored in the area indicating the connection in the direction X+ and in the area indicating the connection in the direction X−. The configuration tables CNFG of the nodes C11 through C34 installed in the casing CSC are similar to the configuration tables CNFG of the nodes B11 through B34.

The nodes D11 through D34 installed in the casing CSD are connected to no nodes in the direction X+ but are connected to the nodes C11 through C34 in the direction X−. Accordingly, the information indicating "ABSENT" is stored in the area indicating the connection in the direction X+ and the information indicating "PRESENT" is stored in the area indicating the connection in the direction X−. The configuration table CNFG illustrated in FIG. 7 may be stored as a table in a storage unit such as register or may be designed with use of a logic circuit (namely, hardware).

FIG. 8 illustrates an example of the control unit CNTB1 illustrated in FIG. 4. The control units CNTA1 through CNTA3, CNTB2 and CNTB3, CNTC1 through CNTC3, and CNTD1 through CNTD3 that are illustrated in FIG. 4 have the same configuration as or configurations similar to the configuration of the control unit CNTB1.

The control unit CNTB1 includes the bus interface BIF, the decoder unit DEC, the mask information holding units MBIT− and MBIT+, the mask unit MSK, the register unit REGU, the summation unit SUM, and the power supply control unit PCNT. The bus interface BIF receives information indicating an abnormality that is transmitted from the nodes B11, B12, B13, and B14, via the control bus CBUS. The bus interface BIF may have a function of transmitting to the nodes B11, B12, B13, and B14 information produced in the control unit CNTB1.

The information indicating an abnormality that is transmitted from the node B11 includes information indicating cutoff of communication to and from the node B11 through X-axis (direction X+ and direction X−), for instance. Alternatively, the information indicating an abnormality that is transmitted from the node B11 includes information indicating cutoff of communication to and from X-axis (direction X+ and direction X−) of the node B21 or B31 connected to the node B11 through B-axis. The information indicating an abnormality that is transmitted from the nodes B11, B12, B13, and B14 is delivered to the bus interface BIF as an interruption request, for instance. The interruption request may be transmitted as packets and/or may be transmitted with use of a dedicated line (included in the control bus CBUS) assigned to each of the nodes B11, B12, B13, and B14.

The decoder unit DEC decodes the interruption request received by the bus interface BIF from the nodes B11, B12, B13, and B14. The decoder unit DEC then identifies the node indicating the abnormality in connection (any of B11 through B14, B21 through B24, B31 through B34) and a direction of X-axis indicating the abnormality in connection (direction X+ or direction X−). The decoder unit DEC outputs the identified information as bit values to the mask unit MSK, for instance. Examples of the bit values will be described with use of FIG. 9.

The mask information holding units MBIT− and MBIT+ hold mask information that masks connection state information the register unit REGU holds. For instance, the mask information holding unit MBIT− stores information on whether the casings CSA and CSB use a common cooling device CDU or not. The mask information holding unit MBIT+ stores information on whether the casings CSB and CSC use a common cooling device CDU or not. The mask information holding units MBIT− and MBIT+ are latch circuits or registers and are set when the information processing system SYS2 is activated, for instance.

In a case where the information indicating that the casings CSB and CSA use the common cooling device CDU is stored in the mask information holding unit MBIT−, the mask unit MSK sets in the register unit REGU a bit value that is outputted from the decoder unit DEC and that corresponds to the casing CSA. In a case where the information indicating that the casings CSB and CSA use no common cooling device CDU is stored in the mask information holding unit MBIT−, the mask unit MSK masks setting in the register unit REGU of the bit value that is outputted from the decoder unit DEC and that corresponds to the casing CSA.

In a case where the information indicating that the casings CSB and CSC use the common cooling device CDU is stored in the mask information holding unit MBIT+, the mask unit MSK sets in the register unit REGU a bit value that is outputted from the decoder unit DEC and that corresponds to the casing CSC. In a case where the information indicating that the casings CSB and CSC use no common cooling device CDU is stored in the mask information holding unit MBIT+, the mask unit MSK masks setting in the register unit REGU of the bit value that is outputted from the decoder unit DEC and that corresponds to the casing CSC.

That is, the mask information holding unit MBIT− stores authorization information that authorizes the setting in the register unit REGU in a case where the casings CSB and CSA reside in the range of the given influence (in a case where the casings CSB and CSA are operated on common conditions). The mask information holding unit MBIT− stores mask information that prohibits the setting in the register unit REGU in a case where the casings CSB and CSA do not reside in the range of the given influence (in a case where the casings CSB and CSA are operated on different conditions). Similarly, the mask information holding unit MBIT+ stores authorization information set by the register unit REGU in a case where the casings CSB and CSC reside in the range of the given influence. The mask information holding unit MBIT+ stores the mask information that prohibits the setting in the register unit REGU in a case where the casings CSB and CSC do not reside in the range of the given influence.

The register unit REGU includes a plurality of registers REG that respectively hold connection state information indicating connection states of the communication paths in the direction X+ and the direction X− for the nodes B11 through B14, B21 through B24, and B31 through B34 that are installed in the casing CSB. That is, the register unit REGU includes the registers REG that correspond to the nodes B11 through B14 installed in the information processing device IPEB1. The register unit REGU further includes the registers REG that correspond to B21 through B24 and B31 through B34 that are installed in the information processing devices IPEB2 and IPEB3 in which the control unit CNTB1 is not installed. Setting of the registers REG that are identified by the decoder unit DEC and authorized by the mask unit MSK is performed. Values set in the registers are outputted to the summation unit SUM. The register unit REGU is an example of a holding unit that holds connection state information indicating connection states of target communication paths connected to the target casing CSA in the range of the given influence that are detected by the detection units DET.

The summation unit SUM outputs an off signal POFF upon detection of the setting of the registers REG corresponding to the direction X+ in the register unit REGU or outputs the off signal POFF upon detection of the setting of the registers REG corresponding to the direction X−. An example of the summation unit SUM is illustrated in FIG. 9.

The power supply control unit PCNT outputs a cutoff signal PSB1off configured to cut off power supply that is outputted from the power supply unit PSB1, based on the off signal POFF. That is, the power supplied to the nodes B11, B12, B13, and B14 installed, together with the control unit CNTB1, in the information processing device IPEB1 is cut off based on the cutoff signal PSB1off. The summation unit SUM and the power supply control unit PCNT are an example of control units configured to control the power supply for the nodes B11, B12, B13, and B14.

In a case where no nodes are connected in the direction X− as in the nodes A11, A21, and A31 (FIG. 5), in the embodiment, mask information (logic 0) is set in the mask information holding unit MBIT−. This makes it possible to mask the setting of the registers REG corresponding to the direction X−. Based on the value stored in the mask information holding unit MBIT−, MBIT+, it is determined whether the bit value outputted from the decoder unit DEC is to be set or not in the register REG by the mask unit MSK. Therefore, a masking function for the setting of the registers REG by the mask unit MSK may be made effective or ineffective by rewriting of the mask information holding unit MBIT−, MBIT+. As a result, the control units CNTA1 through CNTA3, CNTB1 through CNTB3, CNTC1 through CNTC3, and CNTD1 through CNTD3 are allowed to be designed in accordance with common specifications. In a case where the decoder unit DEC malfunctions, the masking function of the mask unit MSK keeps the registers REG from being set and keeps the off signal POFF being faultily outputted.

Figure 9:
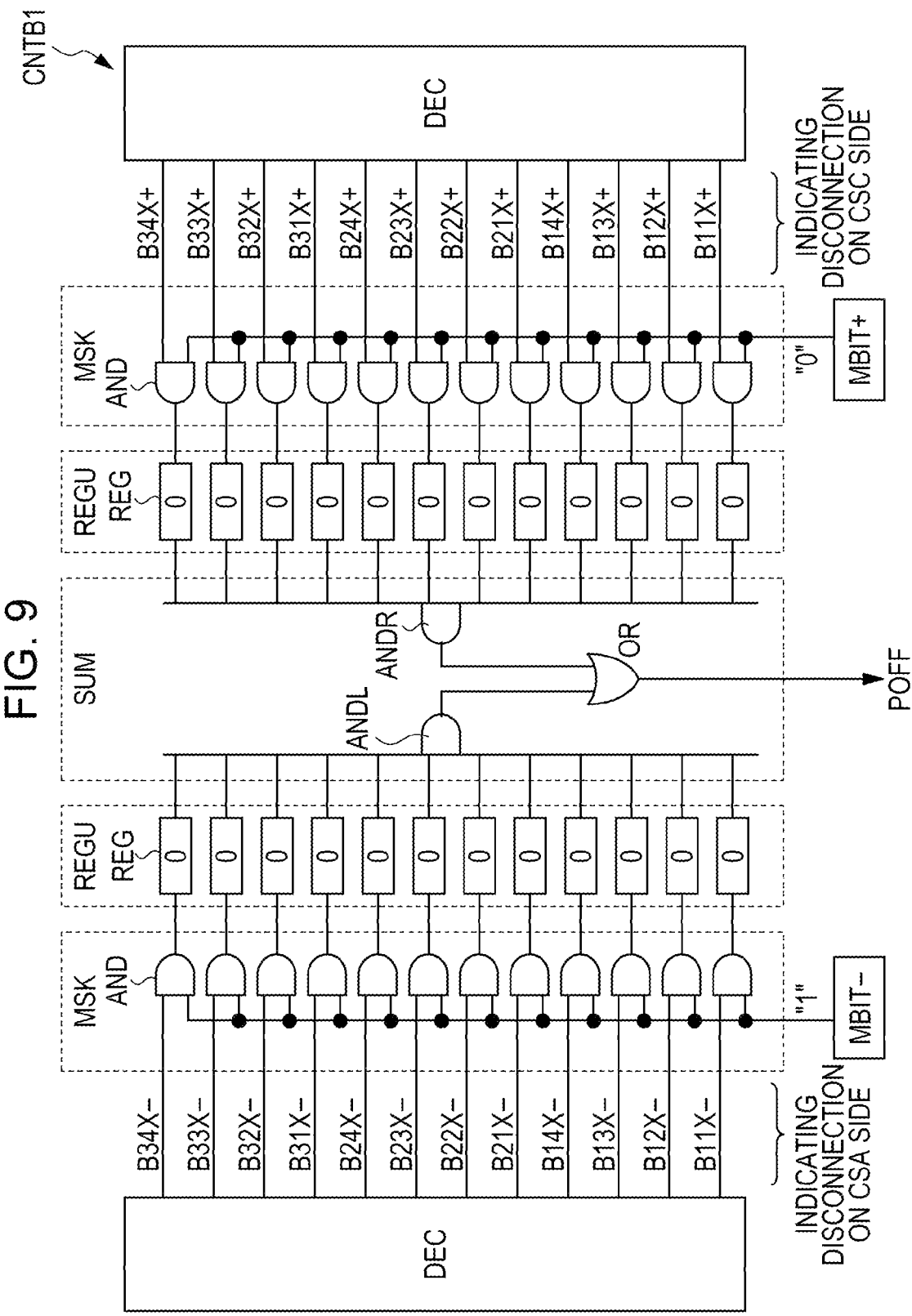
FIG. 9 illustrates examples of a mask unit, a register unit, and a summation unit that are illustrated in FIG. 8.

FIG. 9 illustrates examples of the mask unit MSK, the register unit REGU, and the summation unit SUM that are illustrated in FIG. 8. In FIG. 9, the decoder unit DEC, the mask unit MSK, and the register unit REGU are illustrated as if the units were divided, for convenience in description.

The decoder unit DEC, the mask unit MSK, and the register unit REGU on left side in FIG. 9 are used for control for cutoff of communication with the nodes connected in the direction X− (the nodes A11 through A14, A21 through A24, and A31 through A34 in the casing CSA, in the example). The decoder unit DEC, the mask unit MSK, and the register unit REGU on right side in FIG. 9 are used for control for cutoff of communication with the nodes connected in the direction X+ (the nodes C11 through C14, C21 through C24, and C31 through C34 in the casing CSC, in the example).

When the decoder unit DEC on the left side in FIG. 9 identifies an abnormality in connection of the node B11 in the direction X−, for instance, the decoder unit DEC sets a bit B11X− at active level (logic 1 in the example). The abnormality in the connection of the node B11 in the direction X− is identified on condition that the communication with the node A11 is cut off, for instance.

When the decoder unit DEC identifies an abnormality in connection of the node B12, B13, B14 in the direction X−, similarly, the decoder unit DEC sets pertinent bit B12X−, B13X−, B14X− at active level (logic 1 in the example). When the decoder unit DEC identifies an abnormality in connection of the node B21, B22, B23, B24 in the direction X−, the decoder unit DEC sets pertinent bit B21X−, B22X−, B23X−, B24X− at active level (logic 1 in the example). When the decoder unit DEC identifies an abnormality in connection of the node B31, B32, B33, B34 in the direction X−, the decoder unit DEC sets pertinent bit B31X−, B32X−, B33X−, B34X− at active level (logic 1 in the example).

The mask unit MSK illustrated on the left side in FIG. 9 includes a plurality of AND circuits AND that each receive value of the bit B11X−, B12X−, . . . , B34X− and the value stored in the mask information holding unit MBIT−. In the example, the nodes A11 through A34 of the casing CSA that shares the cooling device CDU1 with the casing CSB are connected in the direction X− of the casing CSB in which the control unit CNTB1 is installed. Therefore, the mask information holding unit MBIT− is set at logic 1 that indicates permission for transfer of output of the decoder unit DEC to the register unit REGU. The AND circuits AND of the mask unit MSK illustrated on the left side in FIG. 9 output the values of the bits B11X−, B12X−, . . . , B34X− to the register unit REGU without masking. The bits B11X−, B12X−, . . . , B34X− received by the mask unit MSK illustrated on the left side in FIG. 9 indicate connection states of the communication paths to and from the nodes A11 through A34 of the casing CSA that shares the cooling system with the casing CSB. That is, the mask information holding unit MBIT− corresponding to the target information processing devices IPEA contained in the target casing CSA that resides in the range of influence of the cooling system where the casing CSB resides holds the mask information (logic 1) that keeps the mask unit MSK (left side) from masking the connection state information.

The decoder unit DEC illustrated on the right side in FIG. 9 operates similarly to the decoder unit DEC illustrated on the left side in FIG. 9. That is, the decoder unit DEC illustrated on the right side in FIG. 9 sets pertinent bit B11X+, B12X+, B13X+, B14X+ at active level (logic 1 in the example) when the decoder unit DEC identifies an abnormality in the connection of the node B11, B12, B13, B14 in the direction X+. The abnormality in the connection of the node B11 in the direction X+ is identified on condition that communication with the node C11 is cut off, for instance.

When the decoder unit DEC identifies an abnormality in connection of the node B21, B22, B23, B24 in the direction X+, the decoder unit DEC sets pertinent bit B21X+, B22X+, B23X+, B24X+ at active level (logic 1 in the example). When the decoder unit DEC identifies an abnormality in connection of the node B31, B32, B33, B34 in the direction X+, the decoder unit DEC sets pertinent bit B31X+, B32X+, B33X+, B34X+ at active level (logic 1 in the example).

The mask unit MSK illustrated on the right side in FIG. 9 includes a plurality of AND circuits AND that each receive value of the bit B11X+, B12X+, . . . , B34X+ and the value stored in the mask information holding unit MBIT+, as the mask unit MSK illustrated on the left side in FIG. 9 does. In the example, the nodes C11 through C34 in the casing CSC that does not share the cooling device CDU1 used by the casing CSB are connected in the direction X+ of the casing CSB in which the control unit CNTB1 is installed. Therefore, the mask information holding unit MBIT+ is set at logic 0 that indicates prohibition against the transfer of the output of the decoder unit DEC to the register unit REGU. The AND circuits AND of the mask unit MSK illustrated on the right side in FIG. 9 mask output of the values of the bits B11X−, B12X−, . . . , B34X− to the register unit REGU. The bits B11X+, B12X+, . . . , B34X+ received by the mask unit MSK illustrated on the right side in FIG. 9 indicate connection states of the communication paths to and from the nodes C11 through C34 in the casing CSC that does not share the cooling system with the casing CSB. That is, the mask information holding unit MBIT+ corresponding to the non-target information processing devices IPEC contained in the non-target casing CSC that does not reside in the range of influence of the cooling system where the casing CSB resides holds the mask information (logic 0) that makes the mask unit MSK (right side) mask the connection state information.

The registers REG of the register unit REGU each hold the bit value received from the decoder unit DEC via the mask unit MSK and output the held value to the summation unit SUM. The control unit CNTB1 resets the registers REG to logic 0 based on instructions to reset the register unit REGU that are issued by a management device which manages the casings CSA, CSB, CSC, and CSD or the like, for instance. For activation of the information processing system SYS2, the management device or the like issues the instructions to reset the register units REGU of the control units CNTB1, CNTB2, and CNTB3. In a case where the power to be supplied to the casing CSA is returned from cutoff state and where the nodes in the casing CSA and the nodes in the casing CSB are normally connected, the management device or the like issues the instructions to reset the register units REGU of the control units CNTB1, CNTB2, and CNTB3. FIG. 9 illustrates a state in which the registers REG have been reset.

The summation unit SUM includes an AND circuit ANDL that receives output of the registers REG illustrated on the left side in FIG. 9, an AND circuit ANDR that receives output of the registers REG illustrated on the right side in FIG. 9, and an OR circuit OR that receives output of the AND circuits ANDL and ANDR and that outputs the off signal POFF. When the output of all the registers REG illustrated on the left side in FIG. 9 are set at logic 1 or when the output of all the registers REG illustrated on the right side in FIG. 9 are set at logic 1, the summation unit SUM sets the off signal POFF at active level (logic 1 in the example).

FIG. 9 illustrates an example of the control unit CNTB1, and other control units CNTB2, CNTB3, CNTA1 through CNTA3, CNTC1 through CNTC3, and CNTD1 through CNTD3 have a configuration similar to a configuration of FIG. 9. Bits B11X−, B12X−, . . . , B34X−, B11X+, B12X+, . . . , B34X+ outputted from the decoder units DEC in the control units CNTB2 and CNTB3 are the same as those of the control unit CNTB1. Logic set in each of the mask information holding units MBIT− and MBIT+ in the control units CNTB2 and CNTB3 is the same as that in the control unit CNTB1. The mask information holding units MBIT+ of the control units CNTB1, CNTB2, and CNTB3 are set at logic 0, so that the setting of the registers REG illustrated on the right side in FIG. 9 is not performed. Therefore, the off signal POFF is kept from being set based on the setting of the registers REG illustrated on the right side in FIG. 9.

As illustrated in FIG. 5, X-axes in the direction X− of the nodes A11 through A14, A21 through A24, and A31 through A34 are not connected to other nodes. In the control units CNTA1 through CNTA3, accordingly, the mask information holding units MBIT− are set at logic 0 that indicates the masking. X-axes in the direction X+ of the nodes A11 through A14, A21 through A24, and A31 through A34 are connected to the nodes B11 through B14, B21 through B24, and B31 through B34 that share the cooling device CDU1 therewith. In the control units CNTA1 through CNTA3, accordingly, the mask information holding units MBIT+ are set at logic 1 that prohibits the masking. The decoder units DEC in the control units CNTA1 through CNTA3 output bits in which first code "B" of each of the bits B11X−, B12X−, . . . , B34X−, B11X+, B12X+, . . . , B34X+ has been replaced by "A", for instance.

As illustrated in FIGS. 4 and 5, X-axes in the direction X− of the nodes C11 through C14, C21 through C24, and C31 through C34 in the casing CSC are connected to the nodes B11 through B14, B21 through B24, and B31 through B34 in the casing CSB that does not share the cooling device CDU1. In the control units CNTC1 through CNTC3, accordingly, the mask information holding units MBIT− are set at logic 0 that indicates the masking. X-axes in the direction X+ of the nodes C11 through C14, C21 through C24, and C31 through C34 are connected to the nodes D11 through D14, D21 through D24, and D31 through D34 that share the cooling device CDU2. In the control units CNTC1 through CNTC3, accordingly, the mask information holding units MBIT+ are set at logic 1 that prohibits the masking. The decoder units DEC in the control units CNTC1 through CNTC3 output bits in which first code "B" of each of the bits B11X−, B12X−, . . . , B34X−, B11X+, B12X+, . . . , B34X+ has been replaced by "C", for instance.

As illustrated in FIGS. 4 and 5, X-axes in the direction X− of the nodes D11 through D14, D21 through D24, and D31 through D34 in the casing CSD are connected to the nodes C11 through C14, C21 through C24, and C31 through C34 that share the cooling device CDU2. In the control units CNTD1 through CNTD3, accordingly, the mask information holding units MBIT− are set at logic 1 that prohibits the masking. X-axes in the direction X+ of the nodes D11 through D14, D21 through D24, and D31 through D34 are not connected to other nodes. In the control units CNTD1 through CNTD3, accordingly, the mask information holding units MBIT+ are set at logic 0 that indicates the masking. The decoder units DEC in the control units CNTD1 through CNTD3 output bits in which first code "B" of each of the bits B11X−, B12X−, . . . , B34X−, B11X+, B12X+, . . . , B34X+ has been replaced by "D", for instance.

Figure 10:
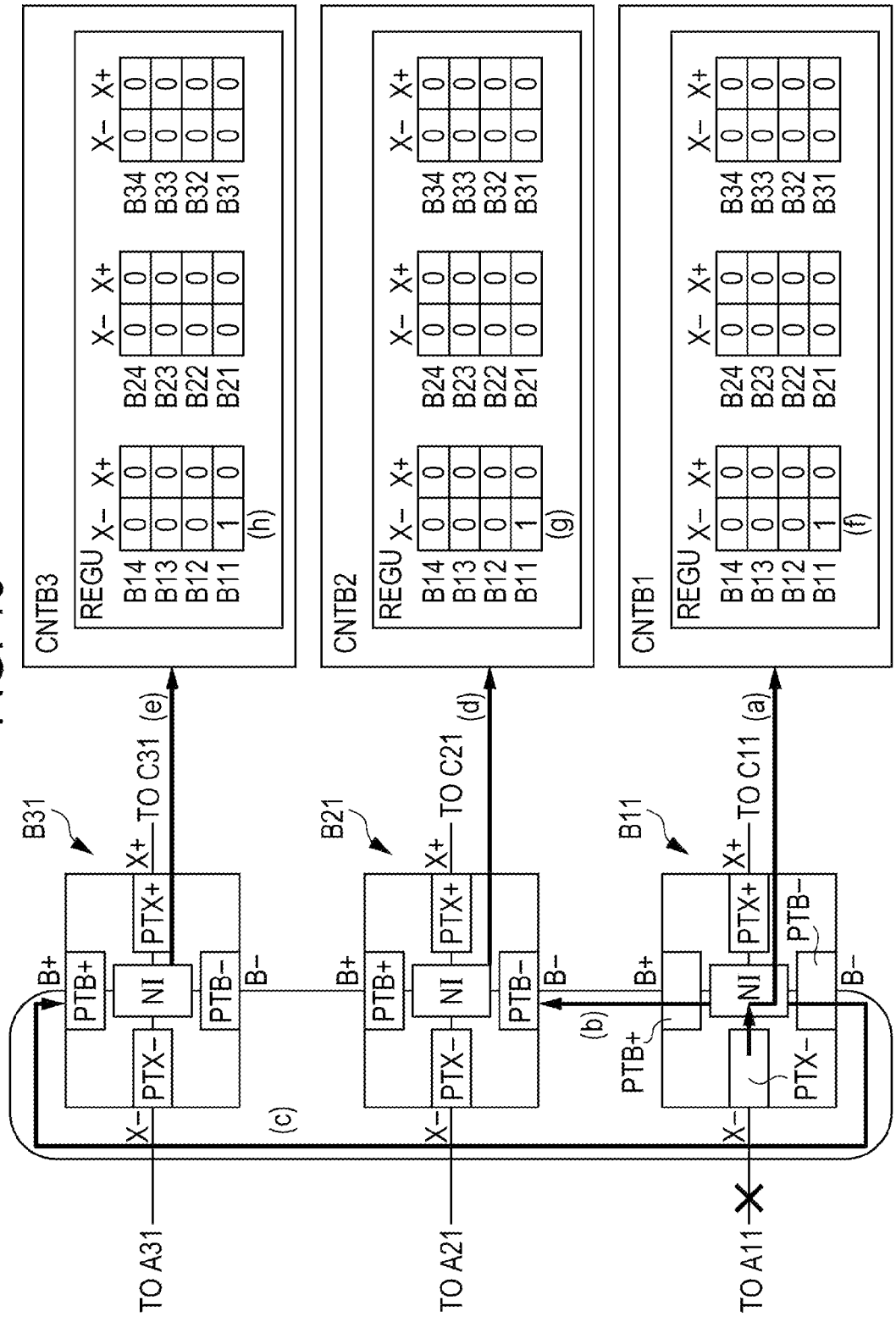
FIG. 10 illustrates an example of operations of the information processing system illustrated in FIG. 4.

FIG. 10 illustrates an example of operations of the information processing system SYS2 illustrated in FIG. 4. In the example, communication (namely, connection) between the nodes A11 and B11 is cut off in response to an abnormality in the node A11 (sign "X" in FIG. 10). Thick arrows in the drawing represent interruption requests to the control units CNTB1, CNTB2, and CNTB3 and notification to the nodes B21 and B31 of the cutoff of the communication.

The port PTX− of the node B11 detects cutoff of communication in the direction X− and notifies the network interface NI of information indicating the cutoff of the communication. The network interface NI refers to the configuration table CNFG illustrated in FIG. 7, recognizes that another node is in connection in the direction X−, and outputs to the control unit CNTB1 an interruption request indicating the cutoff of the communication in the direction X− ((a) in FIG. 10). The network interface NI refers to the configuration table CNFG and notifies the nodes B21 and B31 connected in the direction B+ and the direction B− of the cutoff of the communication in the direction X− ((b) and (c) in FIG. 10).

The network interface NI of the node B21 refers to the configuration table CNFG, recognizes that another node is in connection in the direction X−, and outputs to the control unit CNTB2 an interruption request indicating the cutoff of the communication in the direction X− from another node B11 ((d) in FIG. 10). The network interface NI of the node B31 refers to the configuration table CNFG, recognizes that another node is in connection in the direction X−, and outputs to the control unit CNTB3 the interruption request indicating the cutoff of the communication in the direction X− from another node B11 ((e) in FIG. 10).

The control unit CNTB1 reads out a cause of interrupt from the node B11 in response to the interruption request from the node B11. The control unit CNTB1 receives, from the node B11, the cause of interrupt indicating the cutoff of the communication in the direction X− from the node B11 and sets at logic 1 a register REG, in the register unit REGU, that corresponds to the cause of interrupt ((f) in FIG. 10).

The control unit CNTB2 reads out a cause of interrupt from the node B21 in response to the interruption request from the node B21. As in the control unit CNTB1, a register REG, in the register unit REGU, that corresponds to the cause of interrupt is set at logic 1 ((g) in FIG. 10). Similarly, the control unit CNTB3 reads out a cause of interrupt from the node B31 in response to the interruption request from the node B31 and sets at logic 1 a register REG, in the register unit REGU, that corresponds to the cause of interrupt ((h) in FIG. 10).

The summation unit SUM (FIG. 8) of the control unit CNTB1, however, does not output the off signal POFF because the registers REG assigned to the direction X− are not set. Therefore, the power supply for the nodes B11, B12, B13, and B14 installed together with the control unit CNTB1 in the information processing device IPEB1 is not cut off.

Figure 11:
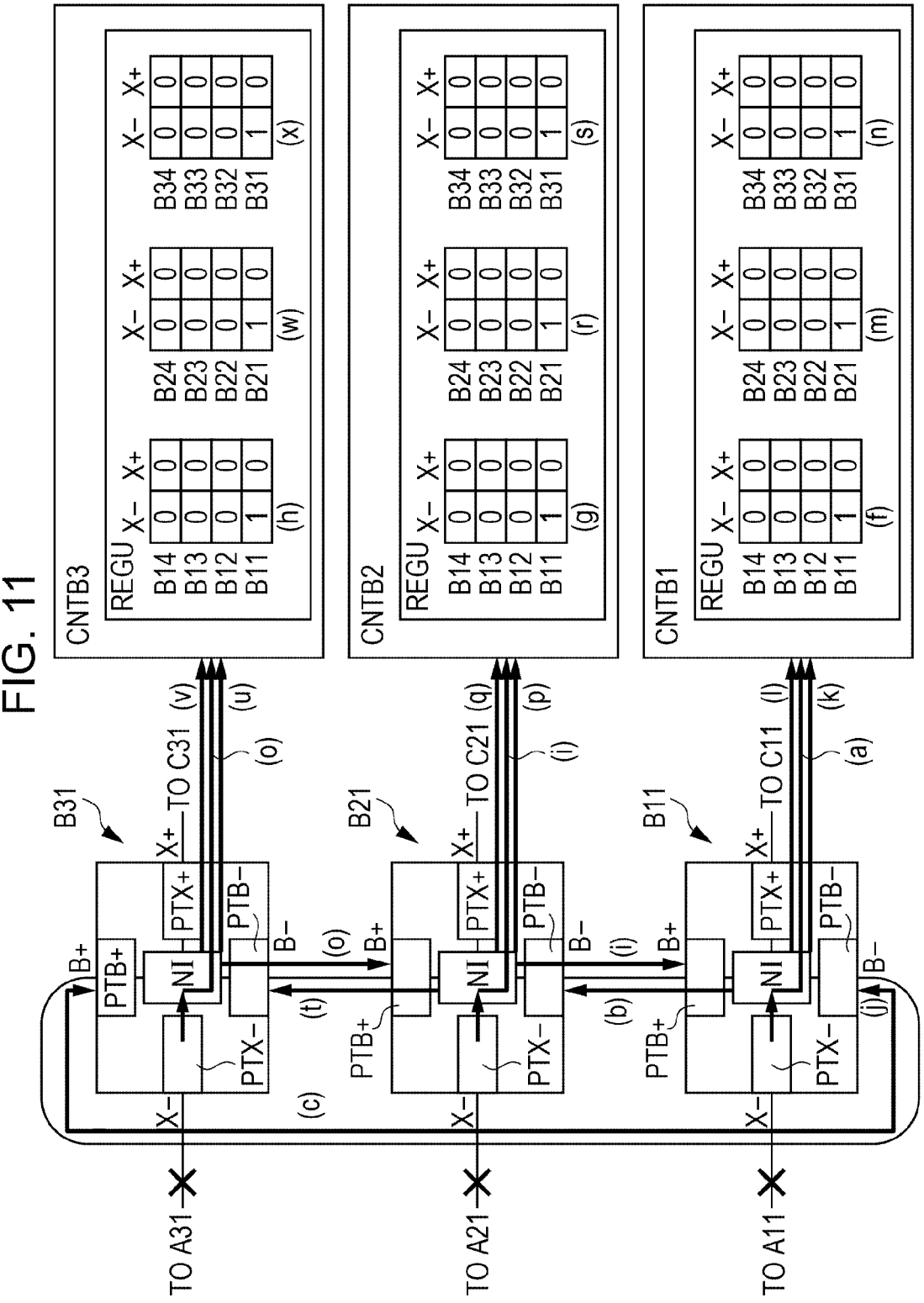
FIG. 11 illustrates another example of operations of the information processing system illustrated in FIG. 4.

FIG. 11 illustrates another example of operations of the information processing system SYS2 illustrated in FIG. 4. Detailed description on operations similar to those in FIG. 10 is omitted. In the example, communication between the nodes A11 and B11, between the nodes A21 and B21, and between the nodes A31 and B31 is cut off in response to abnormalities in the nodes A11, A21, and A31 (three signs "X" in FIG. 11). Reference characters (a) to (h) illustrated in FIG. 11 represent the same operations as are designated by reference characters (a) to (h) illustrated in FIG. 10.

The network interface NI of the node B11 receives notification indicating the cutoff of the communication in the direction X− from the node B21, via the port PTB+ ((i) in FIG. 11). The network interface NI of the node B11 receives notification indicating the cutoff of the communication in the direction X− from the node B31, via the port PTB− ((j) in FIG. 11). The network interface NI of the node B11 carries out the operations illustrated in FIG. 10 and additionally outputs to the control unit CNTB1 interruption requests indicating the cutoff of the communication in the direction X− from the node B21 and in the direction X− from the node B31 ((k) and (l) in FIG. 11).

The control unit CNTB1 receives, from the node B11, causes of interrupt indicating the cutoff of the communication in the direction X− from the nodes B11, B21, and B31 in response to the interruption requests from the node B11. The control unit CNTB1 sets registers REG that correspond to the causes of interrupt at logic 1 ((f), (m), and (n) in FIG. 11).

The network interface NI of the node B21 receives notification indicating the cutoff of the communication in the direction X−, from the port PTX−. The network interface NI of the node B21 receives notification indicating the cutoff of the communication in the direction X− from the node B31, via the port PTB+ ((o) in FIG. 11). The network interface NI of the node B21 carries out the operations illustrated in FIG. 10 and additionally outputs to the control unit CNTB2 interruption requests indicating the cutoff of the communication in the direction X− from the node B21 and in the direction X− from the node B31 ((p) and (q) in FIG. 11).

The control unit CNTB2 receives, from the node B21, causes of interrupt indicating the cutoff of the communication in the direction X− from the nodes B11, B21, and B31 in response to the interruption requests from the node B21. The control unit CNTB2 sets registers REG that correspond to the causes of interrupt at logic 1 ((g), (r), and (s) in FIG. 11).

The network interface NI of the node B31 receives notification indicating the cutoff of the communication in the direction X−, from the port PTX−. The network interface NI of the node B31 receives notification indicating the cutoff of the communication in the direction X− from the node B21, via the port PTB− ((t) in FIG. 11). The network interface NI of the node B31 carries out the operations illustrated in FIG. 10 and additionally outputs to the control unit CNTB3 interruption requests indicating the cutoff of the communication in the direction X− from the node B31 and in the direction X− from the node B21 ((u) and (v) in FIG. 11).

The control unit CNTB3 receives, from the node B31, causes of interrupt indicating the cutoff of the communication in the direction X− from the nodes B11, B21, and B31 in response to the interruption requests from the node B31. The control unit CNTB3 sets registers REG that correspond to the causes of interrupt at logic 1 ((h), (w), and (x) in FIG. 11).

In a state illustrated in FIG. 11, the control units CNTB1, CNTB2, and CNTB3 do not perform setting of the registers REG assigned to the direction X− and thus the summation units SUM (FIG. 8) do not output the off signals POFF. Therefore, the power supplies for the nodes B11 through B14, B21 through B24, and B31 through B34 respectively installed in the information processing devices IPEB1, IPEB2, and IPEB3 are not cut off.

Figure 12:
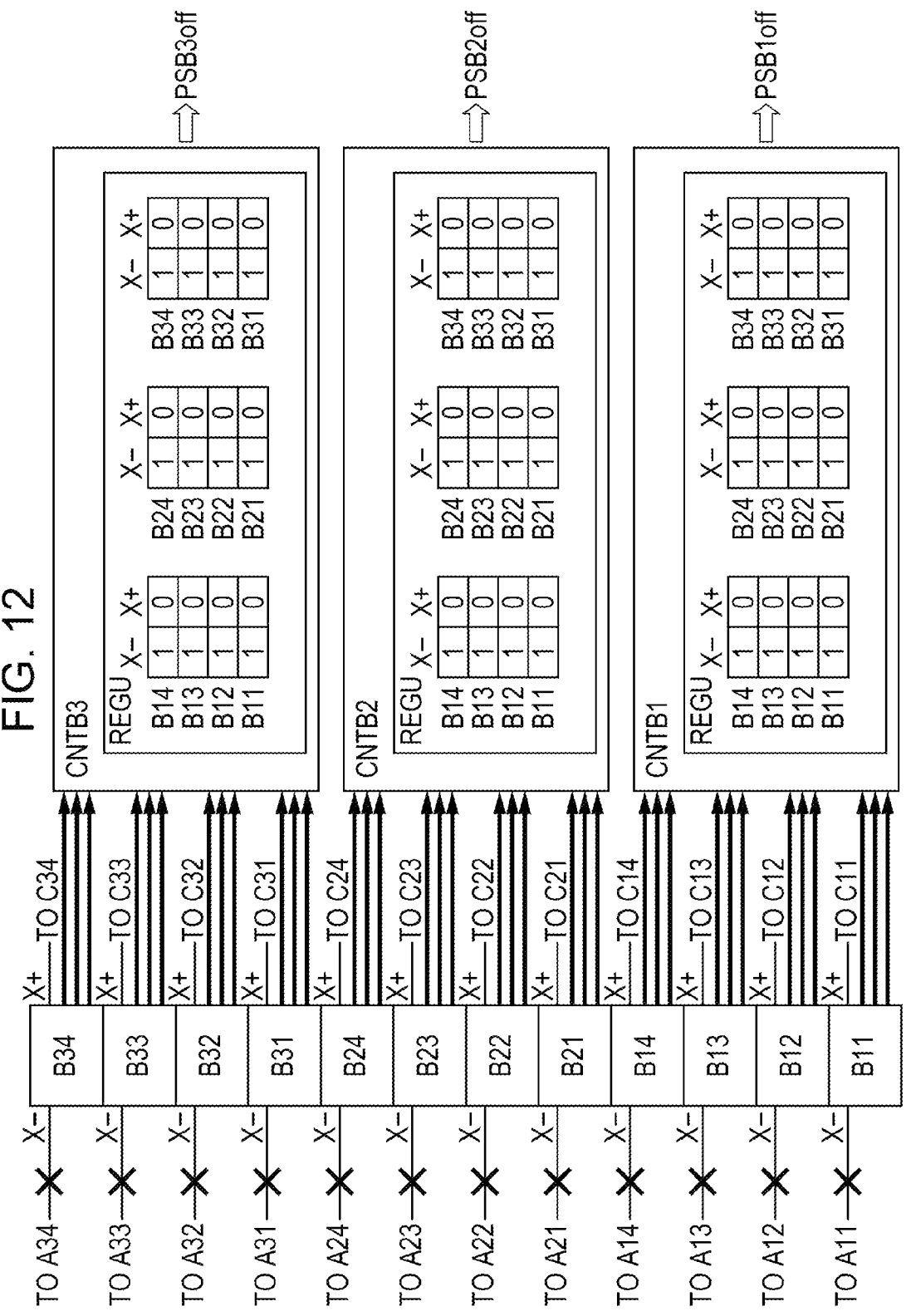
FIG. 12 illustrates still another example of operations of the information processing system illustrated in FIG. 4.

FIG. 12 illustrates still another example of operations of the information processing system SYS2 illustrated in FIG. 4. Detailed description on operations similar to those in FIG. 10 is omitted. In the example, the dew condensation sensor 51 illustrated in FIG. 4 detects dew condensation that occurs in the casing CSA, and the control units CNTA1, CNTA2, and CNTA3 each cut off the power supplied from the power supply unit PSA1 based on the detection of the dew condensation. Thus communication to and from the nodes A11 through A14, A21 through A24, and A31 through A34 that are installed in the casing CSA is cut off (signs "X" in FIG. 12).

Operations in the nodes B11, B21, and B31 are similar to the operations in FIG. 11. The nodes B12 through B14 operate similarly to the node B11 illustrated in FIG. 11, the nodes B22 through B24 operate similarly to the node B21 illustrated in FIG. 11, and the nodes B32 through B34 operate similarly to the node B31 illustrated in FIG. 11.

As in FIG. 11, the control unit CNTB1 receives, from the node B11, causes of interrupt indicating the cutoff of the communication in the direction X− from the nodes B11, B21, and B31 in response to interruption requests from the node B11. The control unit CNTB1 further receives, from the node B12, causes of interrupt indicating the cutoff of the communication in the direction X− from the nodes B12, B22, and B32 in response to interruption requests from the node B12. The control unit CNTB1 receives, from the node B13, causes of interrupt indicating the cutoff of the communication in the direction X− from the nodes B13, B23, and B33 in response to interruption requests from the node B13. The control unit CNTB1 receives, from the node B14, causes of interrupt indicating the cutoff of the communication in the direction X− from the nodes B14, B24, and B34 in response to interruption requests from the node B14.

The control unit CNTB1 sets registers REG that correspond to the causes of interrupt at logic 1. That is, the registers REG to which the direction X− is assigned in the register unit REGU of the control units CNTB1 are set at logic 1, and the control unit CNTB1 outputs the cutoff signal PSB1off. Thus the power supply for the nodes B11 through B14 installed in the information processing device IPEB1 is cut off.

The control units CNTB2 and CNTB3 operate similarly to the control unit CNTB1 and set the registers REG to which the direction X− is assigned in the register unit REGU at logic 1. This results in output of a cutoff signal PSB2off configured to cut off the power supply for the nodes B21 through B24 installed in the information processing device IPEB2 and output of a cutoff signal PSB3off configured to cut off the power supply for the nodes B31 through B34 installed in the information processing device IPEB3.

In a case where the communication paths to and from the nodes A11 through A34 in the casing CSA are cut off due to dew condensation or the like, as illustrated in FIG. 12, the power supply for the nodes B11 through B34 in the casing CSB that shares the cooling device CDU1 with the casing CSA is cut off. In this process, the power supply for the nodes B11 through B34 may be cut off without aid of a management device that manages the casings CSA and CSB or the like and thus may more promptly be cut off in comparison with a configuration with aid of the management device or the like.

The power supply for the nodes B11 through B34 in the casing CSB may be cut off in a case where communication paths to and from a specified number of nodes A are cut off, without limitation to the case where the communication paths to and from all the nodes A11 through A34 in the casing CSA that shares the cooling device CDU1 are cut off. In this method, the information processing devices IPEA contained in the casing CSA that resides in the range of influence from which the information processing devices IPEB in the casing CSB receive a given influence are the information processing devices IPEA including the specified number of nodes A, for instance.

Notification of cutoff of communication that has occurred in the nodes B11 through B34 in the information processing devices IPEB1, IPEB2, and IPEB3 is provided among the information processing devices IPEB1, IPEB2, and IPEB3 in the casing CSB. Thus the cutoff of the power supply for the nodes A11 through A34 in the casing CSA may be detected by each of the information processing devices IPEB1, IPEB2, and IPEB3, and the power supply for the nodes in each of the information processing devices IPEB1, IPEB2, and IPEB3 may be cut off.

Figure 13:
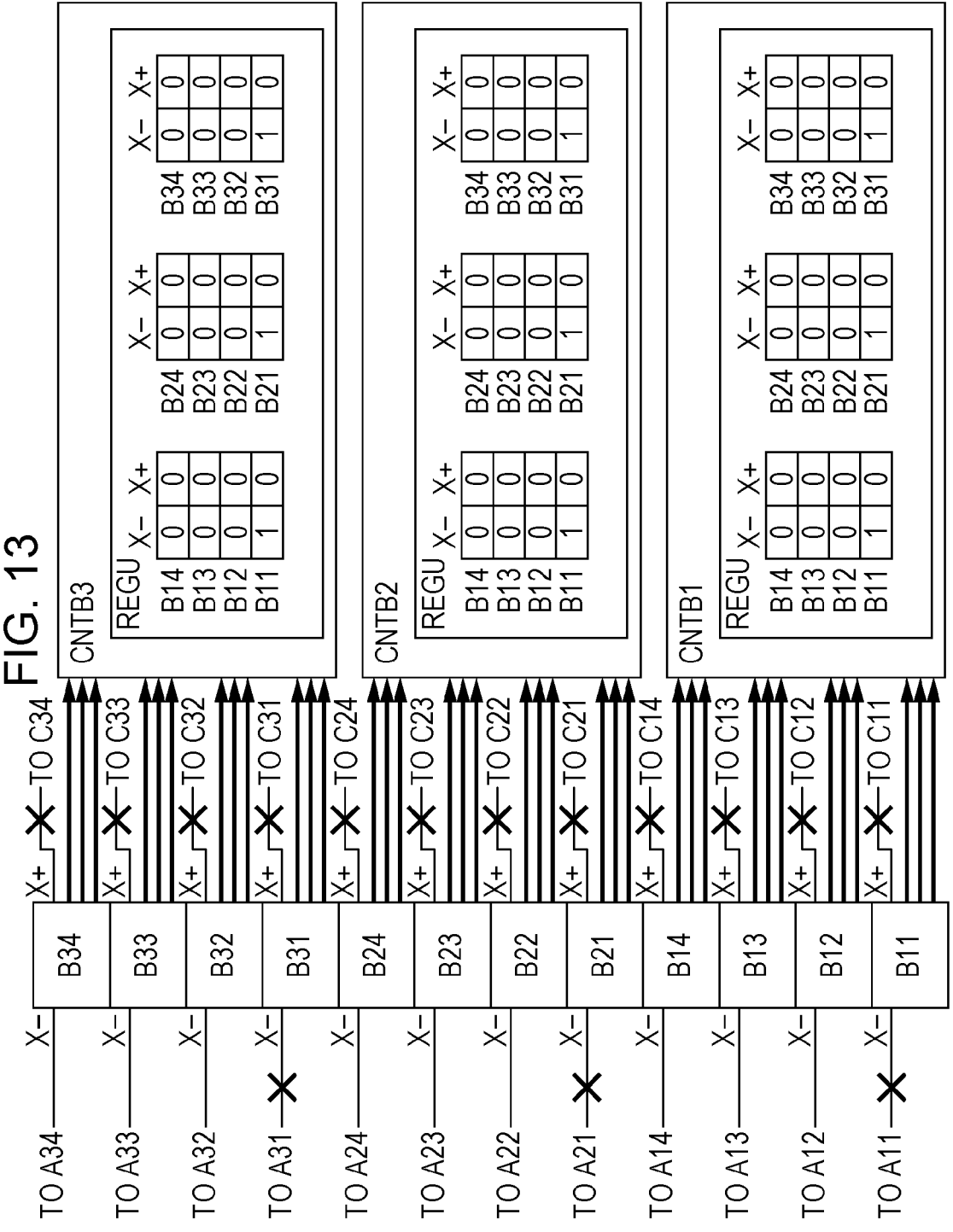
FIG. 13 illustrates yet another example of operations of the information processing system illustrated in FIG. 4.

FIG. 13 illustrates yet another example of operations of the information processing system SYS2 illustrated in FIG. 4. Detailed description on operations similar to those in FIGS. 10 and 12 is omitted. In the example, as in FIG. 11, the communication between the nodes A11 and B11, between the nodes A21 and B21, and between the nodes A31 and B31 is cut off in response to abnormalities in the nodes A11, A21, and A31 (three signs "X" in the direction X− in FIG. 13). The dew condensation sensor S3 illustrated in FIG. 4 detects dew condensation that occurs in the casing CSC, and the control units CNTC1, CNTC2, and CNTC3 each cut off power supplied from the power supply unit PSC1 based on the detection of the dew condensation. Thus communication to and from the nodes C11 through C14, C21 through C24, and C31 through C34 that are installed in the casing CSC is cut off (signs "X" in the direction X+ in FIG. 13).

The control units CNTB1, CNTB2, and CNTB3 set registers REG that correspond to the direction X− of the nodes B11, B21, and B31 based on the cutoff of the communication to and from the nodes A11, A21, and A31, as is the case with FIG. 11. The control units CNTB1, CNTB2, and CNTB3 detect the cutoff of the communication to and from the nodes C11 through C14, C21 through C24, and C31 through C34 that are connected to X-axes in the direction X+, based on interruption requests. The mask unit MSK illustrated on the right side in FIG. 9, however, masks input into the registers REG of the bits B11X+, B12X+, ..., B34X+, in accordance with logic 0 set in the mask information holding unit MBIT+. Accordingly, the registers REG of the register unit REGU illustrated on the right side in FIG. 9 are not set and the off signals POFF are not outputted.

In a case where the power supply for the nodes C11 through C34 in the casing CSC that does not share the cooling device CDU1 is thus cut off, the setting of the registers is prohibited by the mask unit MSK. In a case where excessive cooling of the coolant by the cooling device CDU2 causes dew condensation in the casing CSC, for instance, dew condensation does not occur in the casing CSB that is cooled by the cooling device CDU1. Thus the power supply for the nodes B11 through B34 in the casing CSB is kept from being faultily cut off when the power supply for the nodes C11 through C34 in the casing CSC that is operated on conditions different from those for the casing CSB is cut off. As a result, performance of the information processing system SYS2 is kept from being deteriorated by faulty cutoff of the power supplies. When the power supply for the nodes C11 through C34 in the casing CSC is cut off, the management device that manages the casings CSA, CSB, CSC, and CSD or the like investigates a cause of the cutoff of the communication to and from the nodes C11 through C34 and determines whether the power supply for the nodes B11 through B34 is to be cut off, for instance.

Figure 14:
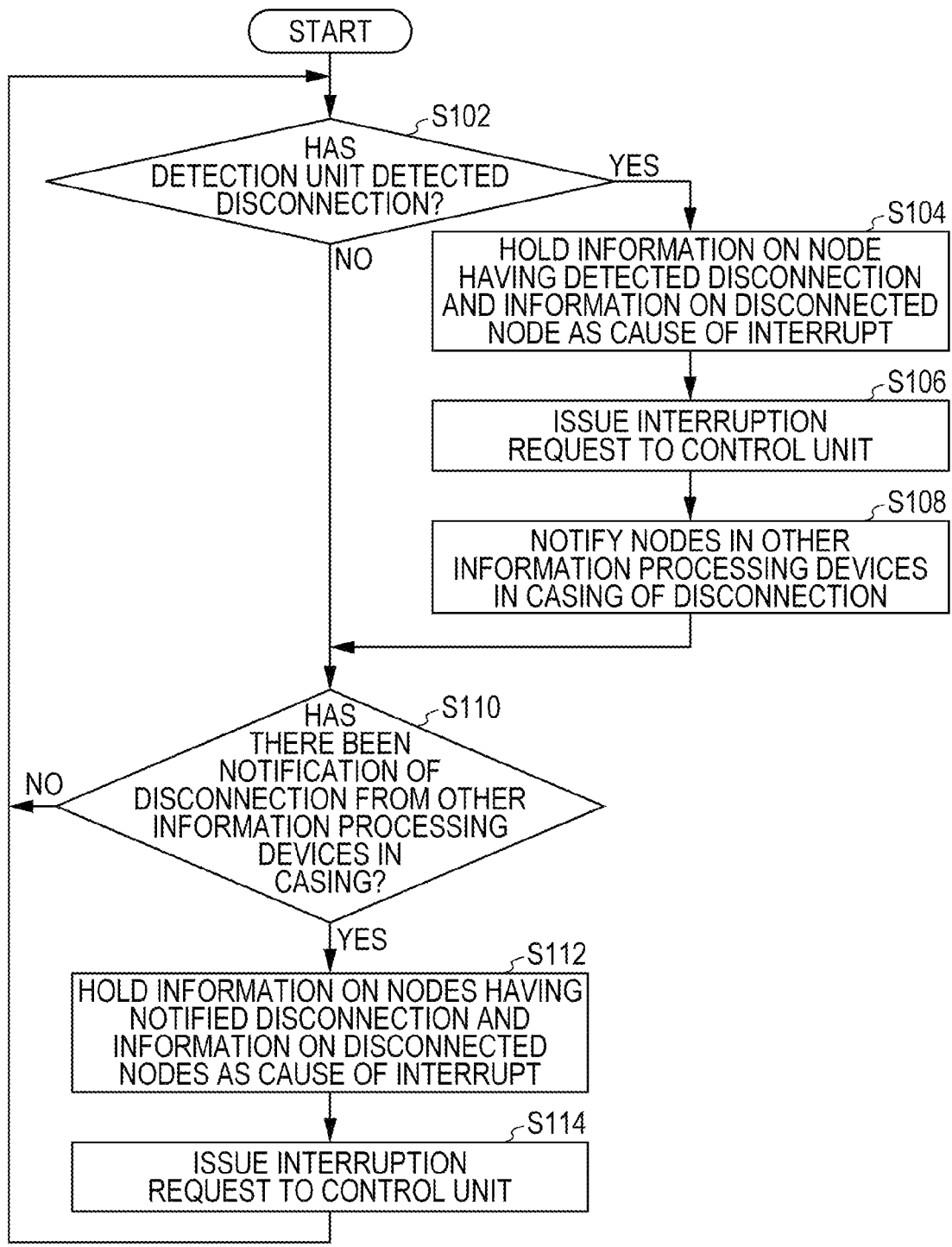
FIG. 14 illustrates an example of operations of the nodes illustrated in FIG. 4.

FIG. 14 illustrates an example of operations of the nodes A11 through A34, B11 through B34, C11 through C34, and D11 through D34 that are illustrated in FIG. 4. Hereinbelow, description will be given with use of operations of the nodes B11 and B21 illustrated in FIG. 10 as an example. Though the operations illustrated in FIG. 14 are carried out by the interface chip IFC (hardware) of each node, the operations may be carried out by execution of programs by the processor PROC installed in each node.

In step S102, the node B11 detects whether communication with the nodes A11 and C11 connected to the communication paths on X-axis in the direction X− and on X-axis in the direction X+ has been cut off or not, by use of the detection units DET of the ports PTX− and PTX+, respectively. The node B21 detects whether communication with the nodes A21 and C21 connected to the communication paths on X-axis in the direction X− and on X-axis in the direction X+ has been cut off or not, by use of the detection units DET of the ports PTX− and PTX+. The operations shift to step S104, if the cutoff of the communication is detected, or the operations shift to step S110, if the cutoff of the communication is not detected.

In step S104, the nodes B11 and B21 each hold information indicating the node (itself) which has detected the cutoff of the communication and information indicating the node for which the cutoff of the communication is detected (either the direction X− or the direction X+, for instance) as a cause of interrupt.

In step S106, subsequently, the node B11 issues an interruption request to the control unit CNTB1 and the node B21 issues an interruption request to the control unit CNTB2.

In step S108, subsequently, the node B11 notifies the nodes B21 and B31 that are installed in other information processing devices IPEB2 and IPEB3 in the casing CSB and that are connected to the node B11 of the cutoff of the communication with the node A11. The node B21 notifies the nodes B31 and B11 that are installed in other information processing devices IPEB3 and IPEB1 in the casing CSB and that are connected to the node B21 of the cutoff of the communication with the node A21. That is, the nodes connected in the direction B− and the direction B+ are notified of the cutoff of the communication with the node connected in the direction X− or the direction X+. After that, the operations shift to step S110.

In step S110, the node B11 determines whether there has been any notification of the cutoff of the communication from the nodes B21 and B31 that are installed in other information processing devices IPEB2 and IPEB3 in the casing CSB and that are connected to the node B11. The node B21 determines whether there has been any notification of the cutoff of the communication from the nodes B31 and B11 that are installed in other information processing devices IPEB3 and IPEB1 in the casing CSB and that are connected to the node B21. The operations shift to step S112, if there has been any notification of the cutoff of the communication from other information processing devices IPEB3 and IPEB1, or the operations return to step S102, if there has been no notification of the cutoff of the communication from other information processing devices IPEB3 and IPEB1.

In step S112, the nodes B11 and B21 each hold information indicating the node which has notified the cutoff of the communication and information indicating the node for which the communication is cut off (either the direction X− or the direction X+, for instance) as a cause of interrupt.

In step S114, subsequently, the node B11 issues an interruption request to the control unit CNTB1 and the node B21 issues an interruption request to the control unit CNTB2. After that, the operations return to step S102 and the operations described above are iterated.

Figure 15:
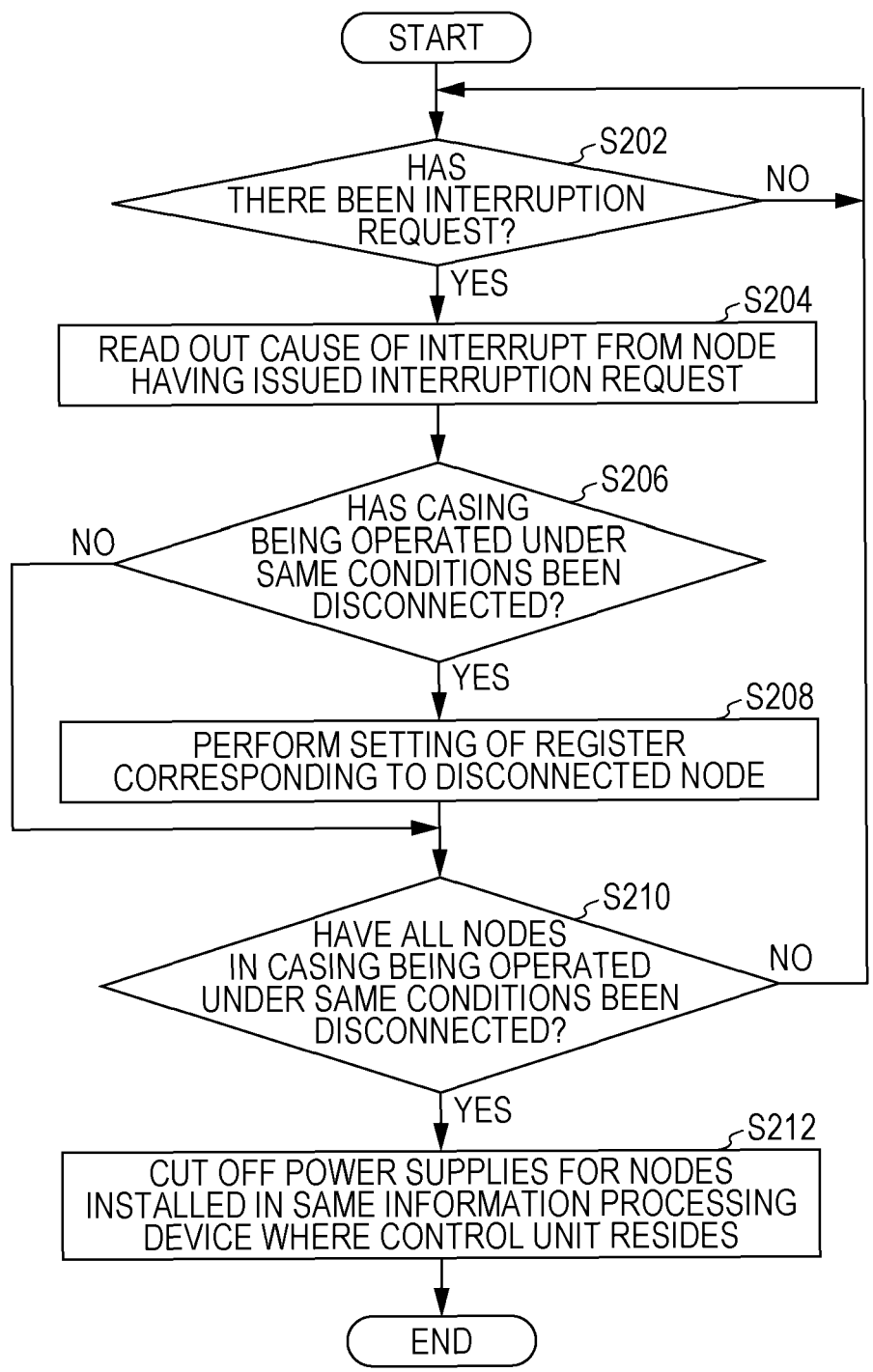
FIG. 15 illustrates an example of operations of a control unit illustrated in FIG. 4.

FIG. 15 illustrates an example of operations of the control units CNTA, CNTB, CNTC, and CNTD that are illustrated in FIG. 4. Hereinbelow, description will be given with use of the operations of the control unit CNTB1 illustrated in FIG. 8 as an example. Though the operations illustrated in FIG. 15 are carried out by the control unit CNTB1 (hardware), the operations may be carried out by execution of programs by a processor such as CPU, provided that the control unit CNTB1 includes the processor.

In step S202, the control unit CNTB1 detects whether any interruption request has been issued or not. Step S202 represents an operation of the bus interface BIF illustrated in FIG. 8, for instance. The operations shift to step S204, if any interruption request has been issued, or the operations iterate step S202, if no interruption request has been issued.

In step S204, the control unit CNTB1 reads out a cause of interrupt from a node having issued the interruption request.

In step S206, subsequently, the control unit CNTB1 determines whether a node which is designated by the cause of interrupt and for which communication has been cut off shares the cooling device CDU1 or not with the casing CSB in which the control unit CNTB1 is installed. That is, the control unit CNTB1 determines whether the communication with the nodes that are operated on the same operating conditions as those for the casing CSB in which the control unit CNTB1 is installed has been cut off or not. Step S206 represents an operation of the mask unit MSK illustrated in FIG. 8, for instance. The operations shift to step S208, if the communication with the node that is operated on the same operating conditions has been cut off, or the operations shift to step S210, if the communication with the node that is operated on different operating conditions has been cut off.

In step S208, the control unit CNTB1 performs setting of a register REG that corresponds to the node for which the communication has been cut off. Step S208 represents operations of the decoder unit DEC and the register unit REGU that are illustrated in FIG. 8, for instance.

In step S210, subsequently, the control unit CNTB1 determines whether the communication with the nodes A11 through A34 in the casing CSA that shares the cooling device CDU1 with the casing CSB has been cut off or not, based on values of the registers REG. That is, it is determined whether the communication with all the nodes in the casing that is operated on the same conditions has been cut off or not. Step S210 represents an operation of the summation unit SUM illustrated in FIG. 8, for instance. The operations shift to step S212, if the communication with all the nodes in the casing that is operated on the same conditions has been cut off, or the operations return to step S202 and the operations described above are iterated, if communication with any nodes in the casing that is operated on the same conditions is allowed. In step S210, it may be determined whether communication with a specified number (50%, 80%, or the like, for instance) of nodes in the casing that is operated on the same conditions has been cut off or not.

In step S212, the control unit CNTB1 cuts off the power that is supplied for the nodes B11 through B14 which are installed together with the control unit CNTB1 in the information processing device IPEB1. Step S212 represents an operation of the power supply control unit PCNT illustrated in FIG. 8, for instance. In a case where the control unit CNTB1 detects the cutoff of the communication with the nodes A11 through A34 in the casing CSA, other control units CNTB2 and CNTB3 in the casing CSB also detect the cutoff of the communication with the nodes A11 through A34, as illustrated in FIG. 12. Accordingly, the control unit CNTB2 cuts off the power that is supplied for the nodes B21 through B24 installed in the information processing device IPEB2 and the control unit CNTB3 cuts off the power that is supplied for the nodes B31 through B34 installed in the information processing device IPEB3. That is, the power that is supplied for the nodes B11 through B34 in the casing CSB is cut off based on the cut off of the communication with the nodes A11 through A34 in the casing CSA.

The above embodiment illustrated in FIGS. 4 through 15 may provide effects similar to effects of the embodiment illustrated in FIGS. 1 through 3. That is, the cutoff of the power supplies PS for the information processing devices IPEA in another casing CSA included in the range of influence where an abnormal state exerts influence may be detected by each of the information processing devices IPEB in the casing CSB and the power supplies PS may consequently be cut off. The information processing devices IPEB notify one another of disconnection states of the communication paths and are thus capable of detecting the cutoff of the power supplies PS for the information processing devices IPEA in the casing CSA included in the range of influence where an abnormal state exerts influence. As a result, the power supplies PS for the information processing devices IPEB may be cut off based on an abnormality that occurs in another casing CSA without aid of a management device that manages the casings CS or the like and the power supplies PS for the information processing devices IPEB may promptly be cut off. The information processing devices IPEB are capable of discriminating a defect caused by influence of an abnormal state and a defect under no influence of the abnormal state and thereby determining whether the power supplies PS are to be cut off.

In the embodiment illustrated in FIGS. 4 through 15, the value that masks the operation of the mask unit MSK is set in the mask information holding unit MBIT+ corresponding to the casing CSC that does not share the cooling device CDU. In a case where the communication with the nodes C11 through C34 in the casing CSC is cut of, accordingly, output of the off signal POFF may be masked and the cutoff of the power supply for the nodes B11 through B34 may be prohibited. That is, the power supply for the nodes B11 through B34 may be kept from being faultily cut off in a case where the communication with the nodes C11 through C34 in the casing CSC for which the operating conditions are different from those for the casing CSB is cut off.

By the setting of the value in the mask information holding unit MBIT−, MBIT+, it may be determined whether the cutoff of the power supply for the nodes B11 through B34 is to be masked or not. Therefore, the control units CNTA1 through CNTA3, CNTB1 through CNTB3, CNTC1 through CNTC3, and CNTD1 through CNTD3 are allowed to be designed in accordance with common specifications.

Figure 16:
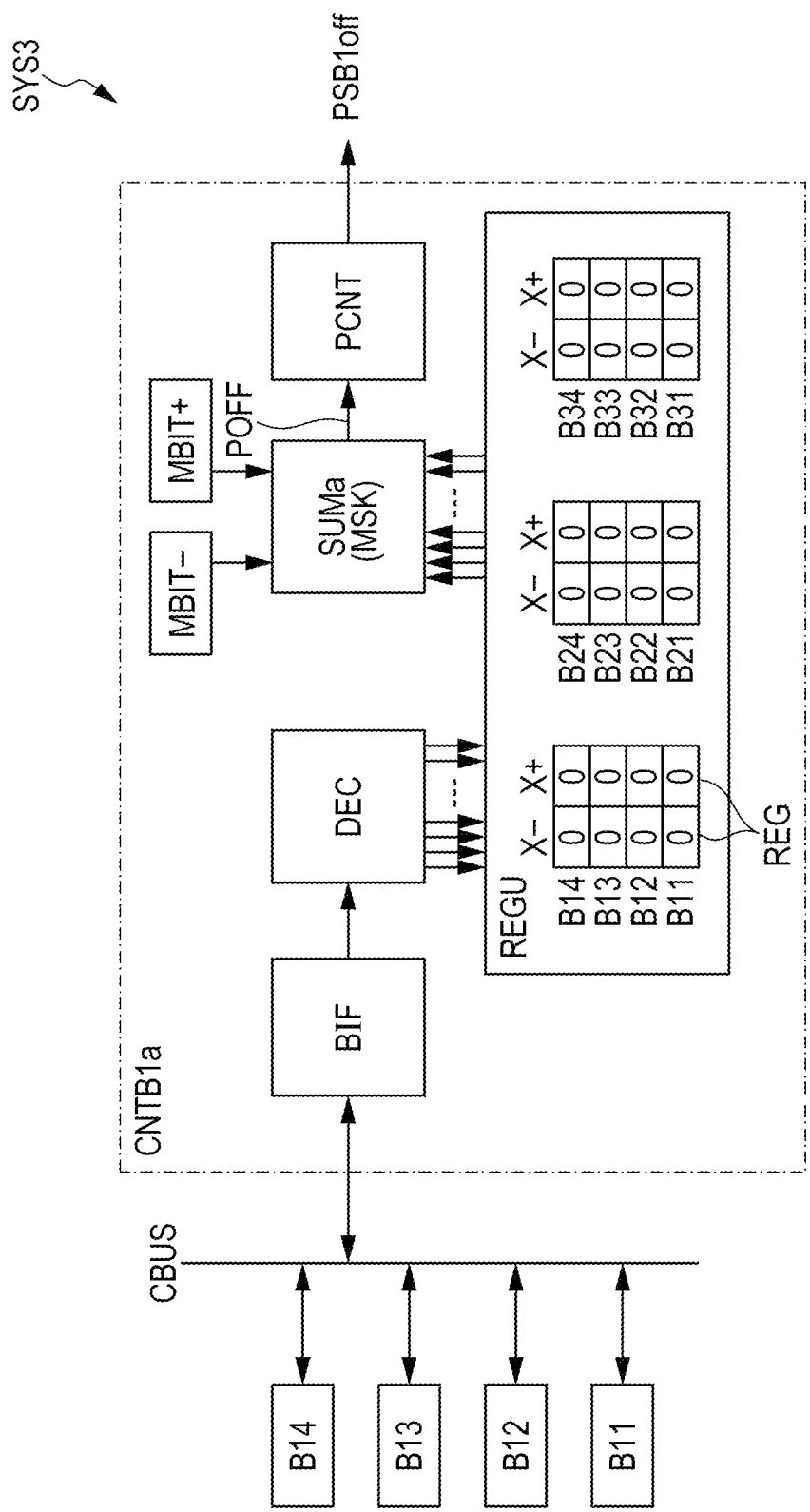
FIG. 16 illustrates an example of a control unit in another embodiment of an information processing system and a control method for the information processing system.

FIG. 16 illustrates an example of the control unit CNTB1 in another embodiment of an information processing system and a control method for the information processing system. Elements identical or similar to elements described for the embodiment illustrated in FIGS. 4 through 9 are designated by the same reference characters and detailed description therefor is omitted.

The information processing system SYS3 of the embodiment includes a control unit CNTB1a in place of the control unit CNTB1 illustrated in FIG. 4. The information processing system SYS3 includes control units having the same functions as or functions similar to functions of the control unit CNTB1a, in place of the control units CNTA1 through CNTA3, CNTB2 and CNTB3, CNTC1 through CNTC3, and CNTD1 through CNTD3 that are illustrated in FIG. 4. Other configurations of the information processing system SYS3 are the same as or similar to those in FIG. 4.

That is, the information processing system SYS3 includes the plurality of casings CS (CSA, CSB, CSC, CSD) and the plurality of power supply units PS (PSA1, PSA2, PSB1, PSB2, PSC1, PSC2, PSD1, PSD2), as is the case with FIG. 4. The information processing system SYS3 further includes the cooling device CDU1 configured to cool the casings CSA and CSB and the cooling device CDU2 configured to cool the casings CSC and CSD, as is the case with FIG. 4.

The control unit CNTB1a includes the bus interface BIF, the decoder unit DEC, the register unit REGU, a summation unit SUMa, and the power supply control unit PCNT. The bus interface BIF, the decoder unit DEC, the register unit REGU, and the power supply control unit PCNT are the same as or similar to the bus interface BIF, the decoder unit DEC, the register unit REGU, and the power supply control unit PCNT that are illustrated in FIG. 8. That is, the control unit CNTB1a does not include the mask unit MSK of the control unit CNTB1 illustrated in FIG. 8 and includes the summation unit SUMa in place of the summation unit SUM of the control unit CNTB1 illustrated in FIG. 8. The summation unit SUMa has functions of the mask unit MSK illustrated in FIG. 8.

Like the decoder unit DEC illustrated in FIG. 8, the decoder unit DEC decodes interruption requests from the nodes B11, B12, B13, and B14 and identifies a node indicating an abnormality in connection and a direction of X-axis indicating the abnormality in connection (direction X+ or direction X−). Herein, the node in which the abnormality in connection is identified is any of the nodes B11 through B14, B21 through B24, B31 through B34 that are installed together with the control unit CNTB1a in the casing CSB. Each of other control units (corresponding to CNTB2 and CNTB3 in FIG. 4) installed in the casing CSB also identifies an abnormality in connection in the nodes B11 through B14, B21 through B24, and B31 through B34. The control unit CNTB1a outputs information indicating the identified abnormality as a bit value to the register unit REGU, for instance.

Upon detection of the setting of the registers REG corresponding to the direction X+ in the register unit REGU, the summation unit SUMa outputs the off signal POFF in accordance with the mask information corresponding to the direction X+. Upon detection of the setting of the registers REG corresponding to the direction X− in the register unit REGU, the summation unit SUMa outputs the off signal POFF in accordance with the mask information corresponding to the direction X−. An example of the summation unit SUMa is illustrated in FIG. 17.

FIG. 17 illustrates examples of the register unit REGU and the summation unit SUMa that are illustrated in FIG. 16. Elements identical or similar to elements in FIG. 9 are designated by the same reference characters and detailed description therefor is omitted. In FIG. 17, as in FIG. 9, the register unit REGU and the decoder unit DEC are illustrated as if the units were divided, for convenience in description.

As is the case with FIG. 9, the decoder unit DEC and the register unit REGU on left side are used for control for cutoff of communication with the nodes connected in the direction X− (the nodes A11 through A14, A21 through A24, and A31 through A34 in the casing CSA, in the example). The decoder unit DEC and the register unit REGU on right side are used for control for cutoff of communication with the nodes connected in the direction X+ (the nodes C11 through C14, C21 through C24, and C31 through C34 in the casing CSC, in the example).

The summation unit SUMa includes AND circuits ANDLa and ANDRa and the OR circuit OR. The AND circuit ANDLa receives output of the registers REG illustrated on the left side in FIG. 17 and a value stored in the mask information holding unit MBIT−. That is, the AND circuit ANDLa outputs logic 1 on condition that the value stored in the mask information holding unit MBIT− is logic 1 and that all the registers REG corresponding to the direction X− hold logic 1. The AND circuit ANDLa outputs logic 0 on condition that the value stored in the mask information holding unit MBIT− is logic 0.

The AND circuit ANDRa receives output of the registers REG illustrated on the right side in FIG. 17 and a value stored in the mask information holding unit MBIT+. That is, the AND circuit ANDRa outputs logic 1 on condition that the value stored in the mask information holding unit MBIT+ is logic 1 and that all the registers REG corresponding to the direction X+ hold logic 1. The AND circuit ANDRa outputs logic 0 on condition that the value stored in the mask information holding unit MBIT+ is logic 0.

Therefore, the control unit CNTB1a masks output of the off signal POFF in a case where the communication with the nodes C11 through C34 in the casing CSC that does not share the cooling device CDU1 is cut off, as illustrated in FIG. 4. In a case where the power supply for the nodes C11 through C34 in the casing CSC under different operating conditions is cut off as in FIG. 13, consequently, the power supply for the nodes B11 through B34 is kept from being faultily cut off and performance of the information processing system SYS3 is kept from being deteriorated by faulty cutoff of the power supplies.

In FIG. 17, the output of the off signal POFF is masked by input of the value stored in the mask information holding unit MBIT− into the AND circuit ANDLa or by input of the value stored in the mask information holding unit MBIT+ into the AND circuit ANDRa. Thus lengths and numbers of branches of signal lines through which the values stored in the mask information holding units MBIT− and MBIT+ are transmitted may be reduced and circuits in the control unit CNTB1 may be simplified in comparison with FIG. 9.

The AND circuit ANDLa is an example of the mask unit that prohibits the output of the off signal POFF and that masks the cutoff of the power supply for the nodes when logic 0 is stored in the mask information holding unit MBIT−. The AND circuit ANDRa is an example of the mask unit that prohibits the output of the off signal POFF and that masks the cutoff of the power supply for the nodes when logic 0 is stored in the mask information holding unit MBIT+.

FIG. 18 illustrates an example of operations of the control unit CNTB1a illustrated in FIG. 16. Detailed description on operations the same as or similar to those in FIG. 15 is omitted. Operations of steps S302, S304, S308, S310, and S312 are the same as or similar to the operations of steps S202, S204, S208, S210, and S212 that are illustrated in FIG. 15.

After step S304, the control unit CNTB1a carries out step S308. The control unit CNTB1a carries out step S311 between step S310 and step S312. In step S311, the control unit CNTB1a determines whether a node which is designated by a cause of interrupt and for which communication has been cut off shares the cooling device CDU1 or not with the casing CSB in which the control unit CNTB1a is installed. An operation of step S311 is similar to the operation of step S206 that is illustrated in FIG. 15 but is carried out after the register REG is set. In FIG. 18, namely, the setting of the register REG is carried out regardless of a value stored in the mask information holding unit MBIT− (or MBIT+) and it is determined after the setting of the register REG whether the output of the off signal POFF illustrated in FIG. 17 is to be masked or not. In step S310, it may be determined whether communication with a specified number (50%, 80%, or the like, for instance) of nodes in a casing that is operated on the same conditions has been cut off or not.

The above embodiment illustrated in FIGS. 16 through 18 may provide effects similar to the effects of the embodiment illustrated in FIGS. 1 through 3 and the embodiment illustrated in FIGS. 4 through 15. In the embodiment illustrated in FIGS. 16 through 18, the lengths and the numbers of branches of the signal lines through which the values stored in the mask information holding units MBIT− and MBIT+ are transmitted may be reduced and circuits in the control unit CNTB1 may be simplified in comparison with FIG. 9.

Features and advantages of the embodiments will be apparent from the above description of embodiments. This intends to make claims cover the features and the advantages of the embodiments as mentioned above within a scope not departing from the spirit and the scope of the claims. Furthermore, it is perceived that those skilled in the art may easily conceive every improvement and modification. Accordingly, the scope of the embodiments with inventiveness is not intended to be limited to the aforementioned and may be based on appropriate improvement and equivalents which are included in the scope disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system that includes a casing and a plurality of other casings, the casing containing a plurality of information processing devices which are respectively connected through communication paths to a plurality of other information processing devices contained in the plurality of other casings,
    wherein the plurality of information processing devices each includes
        a detection unit that detects connection states of all target communication paths to and from a plurality of target information processing devices contained in target casings in a range of influence in which all of the plurality of information processing devices contained in the casing receive a given influence upon stoppage of all of a plurality of other information processing devices contained in other casings, among the plurality of other casings,
        a holding unit that holds connection state information indicating the connection states of all the target communication paths which are detected by the detection unit, and
        a control unit that controls power supplies for the information processing device, based on the connection state information the holding unit holds.

2. The information processing system according to claim 1, further comprising:
    a cooling device that cools the plurality of information processing devices contained in the casing,
    wherein the target casings in the range of influence are other casings that are cooled in common by the cooling device among the plurality of other casings.

3. The information processing system according to claim 2,
    wherein connection between the casing and the cooling device and connection between the target casings and the cooling device are attained through cooling pipes.

4. The information processing system according to claim 1,
    wherein the control unit cuts off the power supply for the information processing device when the connection state information the holding unit holds indicates that all the target communication paths are in disconnection state.

5. The information processing system according to claim 1,
wherein each of the plurality of information processing devices further includes
mask information holding units that hold mask information configured to mask the connection state information the holding unit holds, and
a mask unit that masks the connection state information the holding unit holds, based on the mask information the mask information holding units hold, and
wherein the control unit controls the power supply for the information processing device, based on the connection state information that has been masked by the mask unit.

6. The information processing system according to claim 5,
wherein the mask information holding units that correspond to the plurality of target information processing devices contained in the target casings in the range of influence which causes reception of the given influence hold mask information configured to keep the mask unit from masking the connection state information, and
wherein the mask information holding units that correspond to a plurality of non-target information processing devices contained in non-target casings out of the range of influence which causes the reception of the given influence hold mask information configured to make the mask unit mask the connection state information.

7. The information processing system according to claim 2, further comprising:
sensors configured to detect abnormality in cooling for other casings that are cooled by the cooling device,
wherein the plurality of other information processing devices contained in other casings include control units configured to respectively cut off power supplies for the plurality of other information processing devices based on the abnormality that is detected by the sensors.

8. A control method for an information processing system that includes a casing and a plurality of other casings, the casing containing a plurality of information processing devices which are respectively connected through communication paths to a plurality of other information processing devices contained in the plurality of other casings, the control method comprising:
detecting connection states of all target communication paths to and from a plurality of target information processing devices contained in target casings in a range of influence in which all of the plurality of information processing devices contained in the casing receive a given influence upon stoppage of all of a plurality of other information processing devices contained in other casings, among the plurality of other casings, by a detection unit each of the plurality of information processing devices includes;
holding connection state information indicating the connection states of all the target communication paths which are detected by the detection units, by a holding unit each of the plurality of information processing devices includes; and
controlling power supply for the information processing device, based on the connection state information the holding unit holds, by a control unit each of the plurality of information processing devices includes.

* * * * *